United States Patent
Iihara et al.

(10) Patent No.: US 6,913,540 B2
(45) Date of Patent: Jul. 5, 2005

(54) CONSTANT VELOCITY UNIVERSAL JOINT FOR PROPELLER SHAFT

(75) Inventors: Michio Iihara, Iwata (JP); Yoshihiro Sagisaka, Iwata (JP); Masazumi Kobayashi, Iwata (JP); Akio Sakaguchi, Iwata (JP); Ryuma Mano, Iwata (JP); Kikuo Maeda, Kuwana (JP)

(73) Assignee: NTN Corporation, Osaka (JP)

( * ) Notice: Subject to any disclaimer, the term of this patent is extended or adjusted under 35 U.S.C. 154(b) by 42 days.

(21) Appl. No.: 10/137,654

(22) Filed: May 3, 2002

(65) Prior Publication Data

US 2002/0187841 A1 Dec. 12, 2002

(30) Foreign Application Priority Data

| May 10, 2001 | (JP) | 2001-140281 |
| Jun. 8, 2001 | (JP) | 2001-174563 |
| Jun. 18, 2001 | (JP) | 2001-183367 |
| Mar. 15, 2002 | (JP) | 2002-072409 |

(51) Int. Cl.$^7$ .............................................. F16D 3/227
(52) U.S. Cl. ........................ 464/144; 464/146; 464/902; 464/906
(58) Field of Search ................................ 464/139–146, 464/902, 906

(56) References Cited

U.S. PATENT DOCUMENTS

| 3,633,382 | A | * | 1/1972 | Westercamp | 464/144 |
| 3,908,400 | A | * | 9/1975 | Takahashi et al. | 464/144 |
| 4,027,927 | A | * | 6/1977 | Turner | 384/206 |
| 4,305,263 | A | * | 12/1981 | Kako et al. | 464/145 |
| 4,878,882 | A | * | 11/1989 | Welschof et al. | 464/144 |
| 5,288,273 | A | * | 2/1994 | Krude | 464/145 |
| 5,582,546 | A | * | 12/1996 | Welschof | 464/141 |
| 5,632,683 | A | * | 5/1997 | Fukumura et al. | 464/144 |
| 6,071,210 | A | * | 6/2000 | Kato et al. | 476/42 |
| 6,280,338 | B1 | * | 8/2001 | Hayama et al. | 464/146 |
| 6,390,925 | B1 | * | 5/2002 | Perrow | 464/111 |
| 6,579,187 | B2 | * | 6/2003 | Ramey | 464/17 |

FOREIGN PATENT DOCUMENTS

| DE | 43 33 016 A1 | 3/1994 |
| FR | 1.316.886 | 2/1963 |
| FR | 2.073.671 | 10/1971 |
| JP | 11-247879 | 12/1999 |

* cited by examiner

*Primary Examiner*—Kenneth Thompson
(74) *Attorney, Agent, or Firm*—Arent Fox, PLLC.

(57) ABSTRACT

A constant velocity universal joint for use with a propeller shaft which reduces its weight and size as well as facilitates assembling a stub shaft, thereby reducing the number of parts used and improving rotational balance. The universal joint, comprising: an outer ring with a cup-shaped enlarged diameter portion having track grooves formed on an inner peripheral surface and with a hollow reduced diameter portion integrated with the enlarged diameter portion; an inner ring having track grooves formed on an outer peripheral surface; balls, interposed between the track grooves of the inner and outer rings, for transmitting torque; a cage, accommodated in an annular space between the inner and outer rings, for holding the balls. The universal joint makes possible to form a unit provided with a stub shaft, having a shaft portion inserted from an open end portion of the enlarged diameter portion of the outer ring to mate with the inner ring to enable torque transmission and having an enlarged diameter portion on an end portion extending from the shaft portion, and provided with a boot, attached to the open end portion of the enlarged diameter portion of the outer ring and the shaft portion of the stub shaft, for sealing the joint.

15 Claims, 17 Drawing Sheets

(a)

(b)

(c)

US 6,913,540 B2

CONSTANT VELOCITY UNIVERSAL JOINT FOR PROPELLER SHAFT

BACKGROUND OF THE INVENTION

1. Field of the Invention

The present invention relates to a constant velocity universal joint for use with a propeller shaft that is incorporated into four-wheel drive (4WD) vehicles or front-engine rear-drive (FR) vehicles to transmit a rotational drive force.

2. Description of the Related Art

For example, since an FR vehicle is equipped with an engine, a clutch, and a transmission at the front, and with a differential gear and a drive axle at the rear, respectively, it is common to use a propeller shaft for power transmission therebetween. For an FR-based 4WD vehicle, it is also necessary to equip the vehicle with a rear propeller shaft 6 and a front propeller shaft 3, as shown in FIG. 12. These propeller shafts are equipped with a constant velocity universal joint to accommodate variations in length and angle caused by changes in relative position between the transmission and the differential gears. The propeller shafts are of a double-joint or triple-joint type depending on the structure and required characteristics of the vehicle.

From the viewpoint of reducing the weight of the entire vehicle, the propeller shaft incorporates a sliding constant velocity universal joint, referred to as a Lobro-type (or cross groove type), which is light in weight and has a good rotational balance and vibration properties. This constant velocity universal joint is constructed to accommodate an axial displacement, caused by an axial impact resulting from a collision, between the transmission and the differential gears. On the other hand, the propeller shaft incorporates a double offset type constant velocity universal joint (DOJ) or a Rzeppa-type constant velocity universal joint (BJ) other than the aforementioned Lobro-type constant velocity universal joint (LJ).

As shown in FIG. 13, a Lobro-type constant velocity universal joint 12 that forms the propeller shaft has main components such as an inner ring 13, an outer ring 14, balls 15, and a cage 16.

The inner ring 13 has a plurality of track grooves 17 formed on the outer peripheral surface thereof. A reduced diameter portion of a stub shaft 19 fits into a hole formed at the center of the inner ring 13, and the serrations formed on the inner peripheral surface of the inner ring 13 mate with those formed on the outer peripheral surface of the reduced diameter portion of the stub shaft 19, thereby enabling torque transmission. Furthermore, a snap ring 20 installed in an annular groove of the stub shaft 19 causes the stub shaft 19 to be fixedly positioned to the inner ring 13 in the axial direction.

The outer ring 14, disposed on the outer periphery of the inner ring 13, is provided on the inner peripheral surface thereof with the same number of track grooves 18 as that of the track grooves 17 of the inner ring 13. The track grooves 17 of the inner ring 13 and the track grooves 18 of the outer ring 14 form angles opposite to each other with respect to the axial line. The ball 15 is incorporated into an intersecting portion between the track groove 17 of the inner ring 13 and the track groove 18 of the outer ring 14, which are paired with each other. The cage 16 is interposed between the inner ring 13 and the outer ring 14 to hold the ball 15 inside a pocket of the cage 16. The outer ring 14 is coupled to a companion flange 22, having a hollow portion 21, with bolts 24, while an end cap 23 is being sandwiched therebetween. The end cap 23 serves to prevent leakage of grease filled in the constant velocity universal joint 12 as well as intrusion of foreign material.

There is also interposed a sealing device between the outer ring 14 and the stub shaft 19. The sealing device comprises a boot 25 and a metallic boot adapter 26. The boot 25, having a reduced-diameter end portion and an enlarged-diameter end portion, is folded over at the middle in the shape of a letter V in cross-section. The boot adapter 26, cylindrical in shape, has at one end a flange that fits over the outer peripheral surface of the outer ring 14, being fixed to the outer ring 14 with the bolts 24 in conjunction with the companion flange 22 and the end cap 23. The reduced-diameter end portion of the boot 25 is attached to the stub shaft 19 and fastened with a boot belt 27. The enlarged-diameter end portion of the boot 25 is supported by a caulked end portion of the boot adapter 26.

The companion flange 22 is provided with a hole that communicates with the hollow portion 21, and the reduced diameter portion of a stub shaft 28, different from the stub shaft 19, is inserted into this hole to mate therewith by serrations and fixedly fastened with a bolt 29. A ball bearing 30 is press fitted over the reduced diameter portion of the stub shaft 28. The ball bearing 30 is mounted to the vehicle body via a mounting member 31 and supports the stub shaft 28 in a rotatable manner.

The enlarged diameter portion that extends integrally from the reduced diameter portion of the stub shaft 19 closer to the constant velocity universal joint and the enlarged diameter portion that extends integrally from the reduced diameter portion of the stub shaft 28 closer to the companion flange are pressure coupled by friction to one end of tubes 32, 33 at their respective end portions. The other end of the tube 32 is coupled to the transmission via a constant velocity universal joint or the like and the other end of the tube 33 is coupled to the differential gear via a constant velocity universal joint or the like, thereby forming a propeller shaft 11 of a triple-joint type.

The steps shown in FIGS. 14 to 20 are followed to assemble the propeller shaft 11. First, the enlarged diameter portion of the stub shaft 19 closer to the constant velocity universal joint is pressure coupled by friction to the tube 32 (see FIG. 14). Thereafter, the boot belt 27, the boot 25, and the boot adapter 26 are inserted over the stub shaft 19 (see FIG. 15). Then, the stub shaft 19 is press fitted by serrations into the inner ring 13 of an assembly 34 that has pre-incorporated the inner ring 13, the outer ring 14, the balls 15, and the cage 16, being then fixed with the snap ring 20 (see FIG. 16). Subsequently, after grease has been sealed in the boot 25, the boot adapter 26 is press fitted into the outer ring 14 of the assembly 34. The reduced-diameter end portion of the boot 25 is then placed in a groove of the stub shaft 19 and then fixedly crimped with the boot belt 27. Thereafter, grease is sealed in the end cap 23, which is in turn press fitted into the outer ring 14 (see FIG. 17).

Then, the enlarged diameter portion of the stub shaft 28 closer to the companion flange is pressure coupled by friction to the tube 33 (see FIG. 18). The ball bearing 30 is then press fitted over the reduced diameter portion of the stub shaft 28 (see FIG. 19). Then, after having been mated by serrations with the reduced diameter portion, the companion flange 22 is fixedly coupled thereto with the bolt 29 (see FIG. 20). Thereafter, the constant velocity universal joint 12 that has incorporated the aforementioned stub shaft 19 (see FIG. 17) is coupled to the companion flange 22 that has incorporated the stub shaft 28 (see FIG. 20), and then fixedly coupled thereto with the bolts 24 (see FIG. 13).

Now, consider the aforementioned propeller shaft 11 which is constructed to couple the companion flange 22 to the outer ring 14 of the constant velocity universal joint 12 with the bolts 24. This construction makes it necessary to provide the outer ring; 14 with holes for bolts to be inserted therethrough, thereby resulting in an increase in outer diameter and weight of the outer ring 14. Such an increase in Outer diameter of the propeller shaft 11 would be readily restricted due to its interference with other surrounding parts in the vehicle where the propeller shaft 11 is mounted. On the other hand, an increase in weight of the propeller shaft would also interfere with high speed rotation of the propeller shaft.

Furthermore, the propeller shaft 11 requires the bolts 24 for connecting between the companion flange 22 and the outer ring 14 as well as the bolt 29 for connecting between the companion flange 22 and the stub shaft 28, and the two stub shafts 19, 28 since the propeller shaft 11 is configured to connect between the companion flange 22 and the stub shaft 28 with the bolt 29. This results in an increase in number of parts required. An increase in number of parts would result in an increase in number of connections between the parts, thereby causing a degradation of rotational balance in the propeller shaft that rotates at high speeds.

Still furthermore, the assembly process of the propeller shaft 11 requires the additional steps of connecting between the companion flange 22 and the outer ring 14 of the constant velocity universal joint 12, and between the companion flange 22 and the stub shaft 28. This causes an increase in man-hours required for assembly in addition to an increase in number of parts, thereby resulting in an increase in costs of the vehicle.

FIG. 21 illustrates a non-floating Lobro-type constant velocity universal joint configured such that the minimum inner diameter of the cage 16 is greater than the maximum outer diameter of the inner ring 13. The assembly process of the constant velocity universal joint 12 requires the stub shaft 19 to be press fitted into the hole of the inner ring in the assembly comprising the inner ring 13, the outer ring 14, the balls 15, and the cage 16, with the inner ring 13 being prevented from moving axially by means of a support jig or the like. This is because it is necessary to prevent an excessive force from being applied between the balls 15 and the cage 16 since the stub shaft 19 is press fitted into the inner ring 13 before incorporated into the companion flange 22.

Furthermore, some Lobro-type constant velocity universal joint is configured such that the track grooves 17, 18 are elliptical or Gothic arched in shape, and in angular contact with the ball at a contact curvature ratio of 1.02 to 1.05 to the ball curvature and at a contact angle of 35 to 45 degree. This provides a slight vertex clearance VC at the bottom of the track groove of the inner and outer rings 13, 14 with the balls 15 sitting therein. In addition, this constant velocity universal joint is designed such that the balls 15 are controlled in the intersecting portions between the track grooves 17, 18 of the inner and outer rings 13, 14, and enabled to easily rotate in the axial direction, with a clearance between the track grooves of the inner and outer rings and the balls (i.e., a PCD clearance) being employed as a negative clearance, or with a pre-load being provided for the balls. Thus, the constant velocity universal joint is mainly used for a propeller shaft that is required to provide for a good rotational performance at high speeds.

In such a Lobro-type constant velocity universal joint that provides a pre-load for the ball, the amount of increase in temperature of the universal joint (T) is correlated with the number of rotations (N) and the operating angle (θ). In other words, the universal joint is characterized in that the temperature rises as the value of the number of rotations (N) multiplied by the operating angle (θ) or an rpm-angle value (N·θ) increases. In general, as a guide, the upper limit of the rpm-angle value (N·θ) is such that N·θ>20,000 to 22,000. The Lobro-type constant velocity universal joint is now facing the task of increasing the limit rpm-angle value (N·θ) as much as possible.

Typically, the ball 15 employed in the Lobro-type constant velocity universal joint is tempered at about 180° C. after having been quenched. However, above the limit rpm-angle value (N·θ), the austenite retained in the components of the ball is varied due to the influence of temperature, thereby resulting in an increase in size. This is accompanied by an increase in pre-load, which in turn causes the temperature of the constant velocity universal joint to be further increased or results in a significant peak temperature. Some example in the past shows that the ball 15 having a normal HRC hardness greater than or equal to 60 is degraded to have an HRC of nearly 40 after operation due to the occurrence of the peak temperature.

As means for addressing such a problem, a ball 15 has been suggested which is subjected to a high-temperature size stabilizing treatment at a higher tempering temperature (disclosed in Japanese Patent Laid-Open Publication No. 2000-74082). However, an increase in tempering temperature has caused another problem to occur which the ball 15 inevitably have a lower hardness, thereby impairing the durability of the constant velocity universal joint.

There is another problem with the conventional Lobro-type constant velocity universal joint. That is, since the inner and outer rings 13, 14 have track grooves with a small curvature and a small vertex clearance at the bottom of the groove, a thermal deformation resulting from an increase in temperature of the constant velocity universal joint would cause the ball 15 to be brought into contact with the bottom of the groove. This would lead to a degradation in presence of lubricant, thereby causing a further increase in temperature. The contact of the ball 15 with the bottom would prevent a smooth operation of the constant velocity universal joint.

SUMMARY OF THE INVENTION

It is therefore an object of the present invention to provide a constant velocity universal joint for use with a propeller shaft that facilitates reduction in its weight, size, number of parts, man-hours for assembly, and the cost of the vehicle, and provides an improved efficiency of assembling stub shafts and suitability for high speed rotations.

In order to achieve this object, the present invention provides a constant velocity universal joint for use with a propeller shaft, which comprises an outer ring with a cup-shaped enlarged diameter portion having a plurality of straight track grooves extending axially on a cylindrical inner peripheral surface and with a reduced diameter portion integrated with the enlarged diameter portion. The universal joint further comprises an inner ring having a plurality of straight track grooves formed on a convex spherical outer peripheral surface, the track grooves being opposite to the track grooves of the outer ring; and a plurality of balls, interposed between the track grooves of the inner and outer rings, for transmitting torque. Furthermore, the universal joint comprises a cage, accommodated in an annular space between the inner and outer rings, for holding the balls. The universal joint makes possible to form a unit provided with a stub shaft, having a shaft portion inserted from an open end portion of the enlarged diameter portion of the outer ring to mate with the inner ring to enable torque transmission and having a cup-shaped portion on an end portion extending from the shaft portion, and provided with a boot, attached to the open end portion of the enlarged diameter portion of the outer ring and the shaft portion of the stub shaft, respectively, for sealing the joint. With this arrangement, the inner ring and the stub shaft of the constant velocity universal joint can mate with each other to enable torque transmission, for example, by forming serrations on the inner peripheral surface of the inner ring and the outer peripheral surface of the stub shaft, respectively, to allow the both to mate with each other by the serrations.

According to the present invention, the outer ring of the constant velocity universal joint is integrated with a prior-art companion flange to form the unit comprising the constant velocity universal joint, the stub shaft, and the boot. This makes it possible not only to reduce the weight and size of the outer ring itself but also to reduce the weight and size of the entire joint. It is thus made possible to provide a propeller shaft that allows for readily avoiding interfering with surrounding parts upon mounting the propeller shaft to a vehicle and is suitable for high-speed rotations. A reduced number of parts leads to a decrease in number of connections between parts that affect the balance of rotation, thereby dramatically improving the performance of rotational balance.

Furthermore, the present invention eliminates the need for conventionally necessary parts, that is, a bolt for connecting between the outer ring and the companion flange, a bolt for connecting between the stub shaft and the companion flange, and the stub shaft closer to the companion flange. Thus, the number of parts can be reduced. A reduced number of parts can contribute to the reduction of the number of connections between parts in the unit, thereby improving rotational balance.

Furthermore, in the assembly process of the propeller shaft, the steps of bolting the companion flange to the outer ring of the constant velocity universal joint and bolting the companion flange to the stub shaft are eliminated, thereby reducing the man-hours required for assembly and the costs of the propeller shaft, in conjunction with the reduction in number of parts.

The constant velocity universal joint for a propeller shaft with the aforementioned arrangement is characterized in that a coupling shaft member is coupled to at least either one of the reduced diameter portion of the outer ring or the cup-shaped portion of the stub shaft in the unit, thereby making the constant velocity universal joint connectable via the coupling shaft member. With this arrangement, the boot can be disposed opposite to the connection between the prior-art stub shaft and the coupling shaft member, thereby making it possible to avoid thermal effects at the time of the connection and provide for the coupling shaft member after the unit has been completed. It is possible to form a double-joint propeller shaft by coupling a constant velocity universal joint to one end of the unit via the coupling shaft member, and form a triple-joint propeller shaft by coupling constant velocity universal joints to both ends of the unit via coupling shaft members.

For example, the "coupling shaft member" includes a tube, which enables frictional pressure coupling to the unit.

On the other hand, constant velocity universal joints include a Lobro-type constant velocity universal joint (LJ), a double-offset constant velocity universal joint (DOJ), or a tripod constant velocity universal joint (TJ). In addition to these joints, included is a fixed-type constant velocity universal joint such as a Rzeppa-type constant velocity universal joint (BJ).

Another object of the present invention is to provide a constant velocity universal joint for use with a propeller shaft which allows for reducing its weight and size as well as providing improved efficiency for assembling the stub shaft.

In order to achieve this object, the present invention provides a constant velocity universal joint for use with a propeller shaft comprising a cup-shaped outer ring having a plurality of straight track grooves extending axially on a cylindrical inner peripheral surface; an inner ring having a plurality of straight track grooves formed on a convex spherical outer peripheral surface, the track grooves being opposite to the track grooves of the outer ring. The joint further comprises a plurality of balls, interposed between the track grooves of the inner and outer rings, for transmitting torque; and a cage, accommodated in an annular space between the inner and outer rings, for holding the balls. The constant velocity universal joint is provided with a stub shaft having a shaft portion inserted from an open end portion of the outer ring to mate with the inner ring to enable torque transmission and provided with a boot, attached to the open end portion of the outer ring and the shaft portion of the stub shaft, respectively, for sealing the joint. The constant velocity universal joint is characterized in that a distal end surface of the inner ring is capable of abutting a bottom of the outer ring upon press fitting of the shaft portion of the stub shaft. In this configuration, the distal end surface of the inner ring means the end surface located opposite to the open end portion of the outer ring, and is opposite to the bottom of the outer ring.

The present invention enables reduction in weight and size of the constant velocity universal joint and the distal end surface of the inner ring to abut the bottom of the outer ring upon press fitting of the shaft portion of the stub shaft. In the assembly process of the constant velocity universal joint, it is thereby made possible to cause the distal end surface of the inner ring to be abutted with the bottom of the outer ring and thereby prevented from moving axially upon press fitting the stub shaft to the inner ring in the assembly of the constant velocity universal joint. This allows for preventing an excessive force to be applied between the ball and the cage, thereby providing improved efficiency for the assembly of the stub shaft. Here, the assembly means an outer ring incorporating an inner ring, balls, and a cage.

Suppose that the distal end portion of the cage abuts the bottom of the outer ring upon press fitting of the shaft portion of the stub shaft, this would cause an excessive force to be applied between the ball and the cage. To avoid this problem, it is necessary to extend the distal end portion of the inner ring, thereby enabling only the distal end portion of the inner ring to abut the bottom of the outer ring.

Furthermore, it is desirable to configure the aforementioned arrangement such that an annular groove is formed on the shaft end portion of the stub shaft; a stepped portion is formed so as to oppose the annular groove on the end portion of the inner ring; a ring with ends is installed in an annular space defined by these annular groove and stepped portion, the ring being circular in cross section and radially compressible. Before the shaft end portion of the stub shaft is press fitted into the inner ring, the ring with ends is pre-installed in the annular groove of the shaft end portion. At the time of press fitting of the stub shaft into the inner ring, the ring with ends is compressed radially while being pushed into the hole of the inner ring and then springs out into the stepped portion of the inner ring upon reaching the stepped portion, thereby allowing the stub shaft to be axially fixed with respect to the inner ring.

The stepped portion of the inner ring opposite to the annular groove on the shaft end portion of the stub shaft may be formed at a position where the shaft end portion of the stub shaft does not protrude from an end portion of the inner ring. Then, the bottom of the outer ring may be made flat, thereby making it possible to simplify the outer shape of the outer ring and thereby shorten the entire length of the outer ring.

As the aforementioned constant velocity universal joint, it is preferable to employ a Lobro-type constant velocity universal joint configured such that a track groove is formed on each of the outer peripheral surface of the inner ring and the inner peripheral surface of the outer ring so as to intersect each other; a ball is placed at an intersecting portion of both grooves; and the ball is interposed between the outer peripheral surface of the inner ring and the inner peripheral surface of the outer ring and held with a cage having a concave spherical inner peripheral surface.

This Lobro-type constant velocity universal joint is characterized in that the inner diameter of an end portion of the cage is less than the outer diameter of the inner ring. A constant velocity universal joint of this type is called a floating type, in which the minimum inner diameter of the cage is less than the maximum outer diameter of the inner ring, thus preventing the ball from dislodging from the assembly upon assembling the constant velocity universal joint, and facilitating the handling of the constant velocity universal joint. In addition, the deep track grooves of the inner ring provide a large load capacity.

The aforementioned Labro-type constant velocity universal joint is applicable to a type of joint constructed to have an inner diameter of an end portion of the cage that is greater than an outer diameter of the inner ring. A constant velocity universal joint of this type is called a non-floating type, in which the minimum inner diameter of the cage is greater than the maximum outer diameter of the inner ring. When an axial impact is applied to the stub shaft or the outer ring at the time of a collision of the vehicle, it is possible to ensure a sliding width sufficiently enough for the inner ring related parts that comprise the inner ring, the ball, and the cage, thereby providing an advantage of accommodating a large axial displacement.

The aforementioned Lobro-type constant velocity universal joint is characterized in that a curvature center of a convex spherical outer peripheral surface of the inner ring is axially offset by an equal distance from each other with respect to a center of a ball. The joint is also characterized in that the inner peripheral surface of the cage is concave spherical in shape, and the radius of curvature of the concave spherical inner peripheral surface is substantially equal to the radius of curvature of the convex spherical outer peripheral surface of the inner ring. With this arrangement, for example, when an axial impact is applied to the joint at the time of a collision of the vehicle, the inner ring related parts comprising the cage, the ball, and the inner, ring thereby slide axially with respect to the outer ring. In this case, this arrangement allows the inner peripheral surface of the cage to contact the outer peripheral surface of the inner ring, thereby preventing the inner ring and the cage from being damaged.

Still another object of the present invention is to provide a constant velocity universal joint for use with a propeller shaft that provides improved high-temperature size stability, is usable even under operating conditions at high values of rpm-angle (N·θ), and has good durability. The joint also reduces interference of the ball with the track groove bottom even under operating conditions at high values of rpm-angle (N·θ), facilitates the presence of a lubricant, and provides an improved performance of preventing an increase in temperature.

To achieve this object, the constant velocity universal joint according to the present invention is characterized in that the ball is made of a heat resisting steel and tempered after having been subjected to quenching or carbonitriding; the ball has a surface hardness of 58 or more in HRC after having been tempered; and the maximum size of a carbide grain is 8 $\mu$m or less.

When compared to typical steels, the heat resisting steel provides less variation in size caused by compositional changes at high temperatures, and less degradations in surface hardness. In contrast to typical steels for use with a constant velocity universal joint (e.g., high carbon chromium steel), the heat resisting steel has preferably a good high-temperature size stability and high-temperature softening resistance at high temperatures under operation of a Lobro-type constant velocity universal joint for use with a propeller shaft.

Even when the temperature of the joint has increased under operating conditions at high values of rpm-angle (N·θ), using such a heat resisting steel having a good high-temperature size stability prevents an increase in size caused by changes in composition of the ball at high temperatures, thereby preventing a sudden increase in temperature of the joint due to an increase in preload. Furthermore, using the heat resisting steel prevents the ball from softening at high temperatures and being reduced in durability.

The ball is made of the heat resisting steel and tempered after having been subjected to quenching or carbonitriding and the ball has a surface hardness of 58 or more in HRC after having been tempered.

It has been found that the surface hardness and the fatigue life of the ball are correlated with each other, with the tendency such that the higher the surface hardness, the longer the fatigue life. At a surface hardness of less than 58 in HRC, the fatigue life tends to be suddenly shortened, and variations in life are worsened. A hardness of 58 or more in HRC is required to improve life at high temperatures and reduce variations in life. For this reason, the hardness is limited to 58 or more in HRC.

Carbides in the steel maintain hardness of balls being tempered and prevent changes in compositional structure of the ball under development of fatigue, thereby providing improved fatigue life. At this time, about the relationship between the maximum size of carbide grains and fatigue life of the ball, it has been found that the presence of a large carbide grain causes life to be reduced. More specifically, the presence of a large carbide grain having a maximum size greater than 8 $\mu$m causes a sudden reduction in life to occur. For this reason, the maximum size of carbides was determined to be 8 $\mu$m.

According to the present invention, the heat resisting steel has preferably a content of alloy elements by mass of 0.6% to 1.3% of C, 0.3% to 3.0% of Si, 0.2% to 1.5% of Mn, 0.03% or less of P. 0.03% or less of S, 0.3% to 5.0% of Cr, 0.1% to 3.0% of Ni, 0.050% or less of Al, 0.003% or less of Ti, 0.0015% or less of O, 0.015% or less of N, and the remainder of Fe and unavoidable impurities.

Such compositions of the heat resisting steel or a material of the ball improve the high-temperature size stability of the ball, thereby making it possible to use the ball under operating conditions at large values of N·θ. The ball is provided with a low degree of degradation in surface hardness caused by tempering at high temperatures and a good durability. It is also possible to obtain as high a hardness as 58 or more in HRC even when the ball has been tempered at high temperatures (e.g., at 350° C.). Tempering the ball at such high temperatures reduces the amount of retained austenite. This makes it possible to provide size stability at high temperatures and as high a hardness as 58 or more in HRC. When compared to prior-art balls, it is possible to improve their fatigue life and wear resistance at high temperatures.

According to the present invention, the track grooves of the inner and outer rings are preferably elliptical or Gothic arched in cross-sectional shape, and at least the ratio of a groove radius of curvature at a contact point between the track groove of the inner ring and the ball to a radius of the ball is 1.05 to 1.10.

With the track grooves being made elliptical or Gothic arched in cross-sectional shape, the ball is in point contact with both the sides of a groove. In this case, for example, by setting the ratio of a groove radius of curvature at the contact point to the radius of the ball within the range from 1.05 to 1.10, the groove bottom to vertex clearance between the track grooves and the ball is 1.7 to 1.9 times that of prior-art joints having a typical ratio of (below) 1.02 to 1.05. This makes it possible to prevent the ball from interfering with the bottom of the track grooves due to thermal deformation of the ball caused by an increase in temperature of the joint even under operating conditions at large values of N·θ. Furthermore, a clearance is provided on the bottom of the track grooves to allow a lubricant to stay thereon, thereby improving the performance of preventing temperatures from rising.

According to the present invention, of the track grooves of the inner and outer rings, a contact angle between at least the track groove of the inner ring and the ball may be 35 to 45 degrees.

Changes in contact angle would vary the contact point between the track grooves and the ball. At excessively large contact angles, there is a possibility of causing the contact ellipse serving as a contact point to overrun the shoulder portion of a track groove, which is not preferable from the viewpoint of durability. At excessively small contact angles, the ball readily interferes with the groove bottom. For this reason, the contact angle is typically within the range of 35 to 45 degrees. Consider a case where the ratio of the groove radius of curvature at the contact point to the radius of the ball is set within the range from 1.05 to 1.10 and the contact angle lies within the range of 35 to 45 degrees. In this case, a sufficiently large groove bottom to vertex clearance can be obtained, thereby making it possible to reduce the possibility of the ball interfering with the bottom of the track grooves under operating conditions at large values of N·θ.

DETAILED DESCRIPTION OF THE PREFERRED EMBODIMENTS

Now, the present invention will be explained below in more detail with reference to the accompanying drawings in accordance with embodiments. As a sliding constant velocity universal joint that forms a propeller shaft, this embodiment to be described below employs a floating Lobro-type (or cross groove type) constant velocity universal joint, and in particular, a high-speed Lobro-type constant velocity universal joint (LJ) which has a smaller crossing angle of track grooves than a typical Lobro-type constant velocity universal joint and is suitable for high speed rotations. From viewpoint of reducing the weight of an entire vehicle, it is preferable to employ, as a constant velocity universal joint for use with a propeller shaft, a light-weight Lobro-type constant velocity universal joint (LJ) which has a good rotational balance and vibration property with respect to the weight of the universal joint. However, it is still possible to employ a typical Lobro-type constant velocity universal joint.

There are two types of Lobro-type constant velocity universal joint: a floating type with a cage having a minimum inner diameter less than a maximum outer diameter of an inner ring, and a non-floating type with a cage having a minimum inner diameter greater than a maximum outer diameter of an inner ring. The present invention is applicable to both the types.

Figure 12:
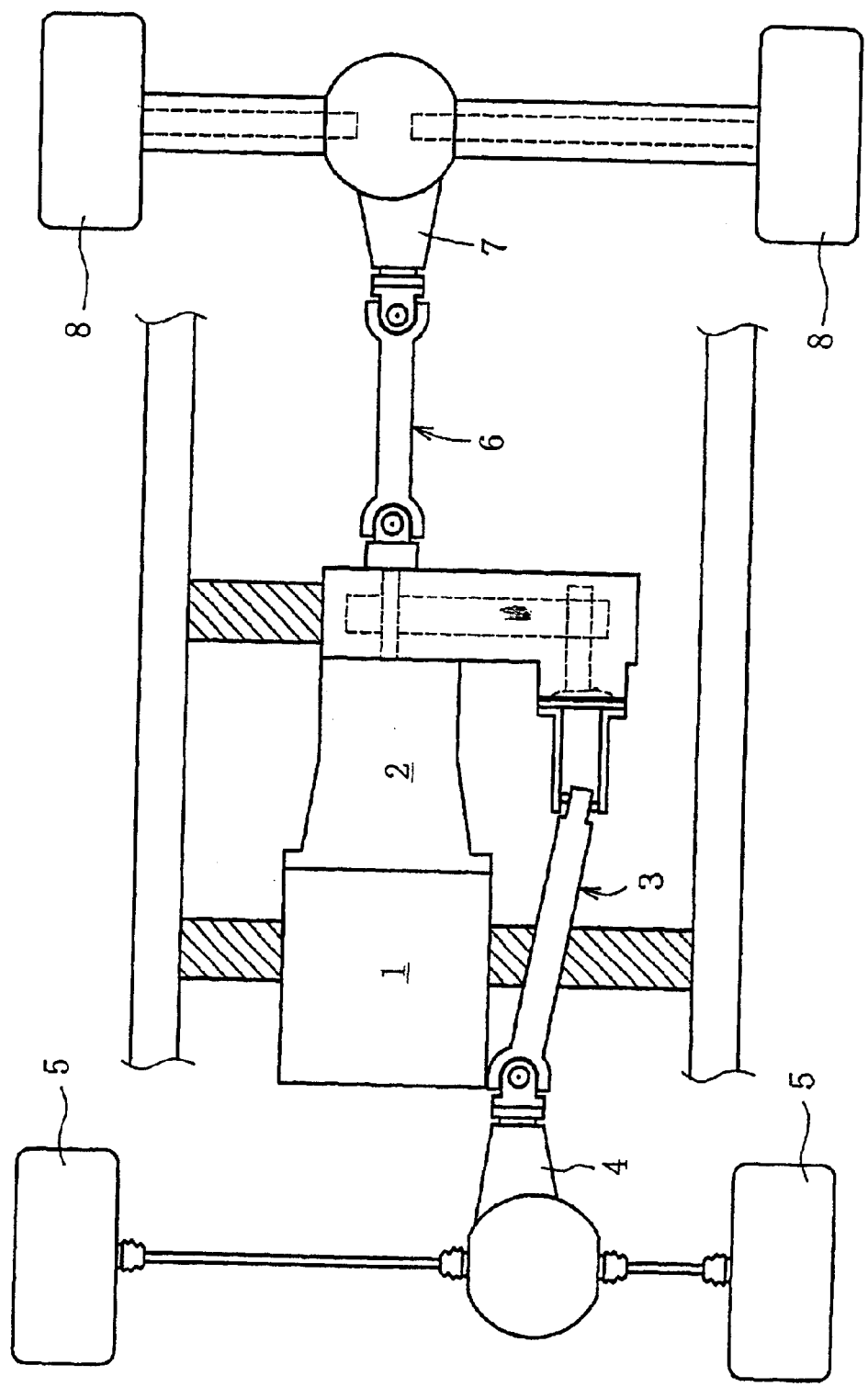
FIG. 12 is a schematic plan view illustrating the drive system of a four-wheel drive vehicle.
Figure 13:
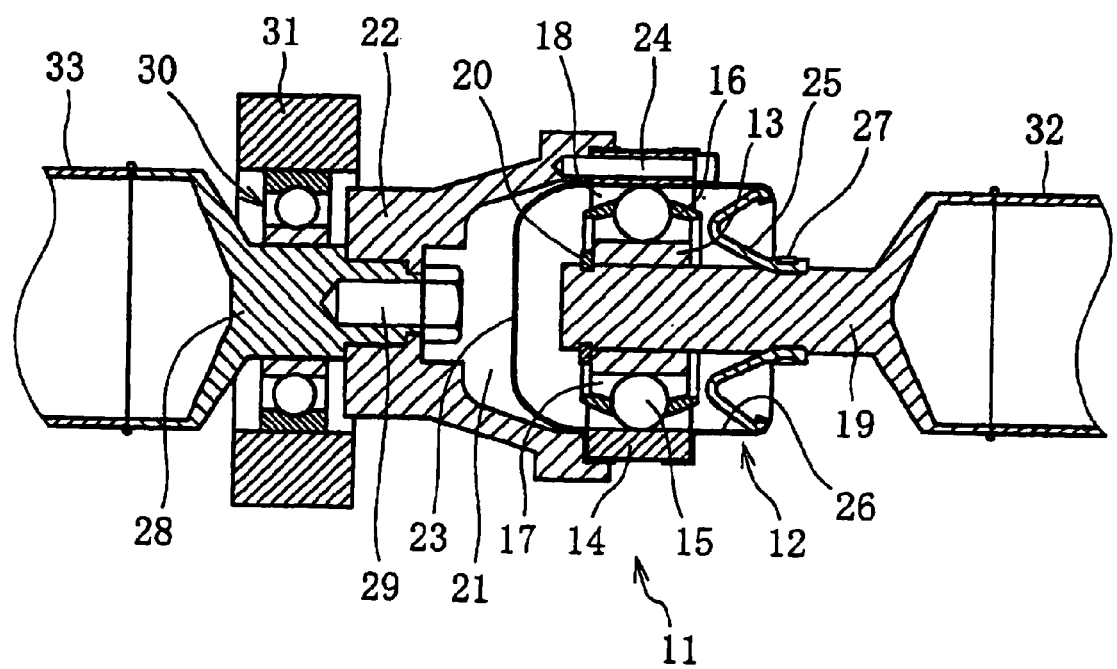
FIG. 13 is a cross-sectional view illustrating an exemplary prior-art constant velocity universal joint for use with a propeller shaft with the propeller shaft having been completely assembled.
Figure 14:
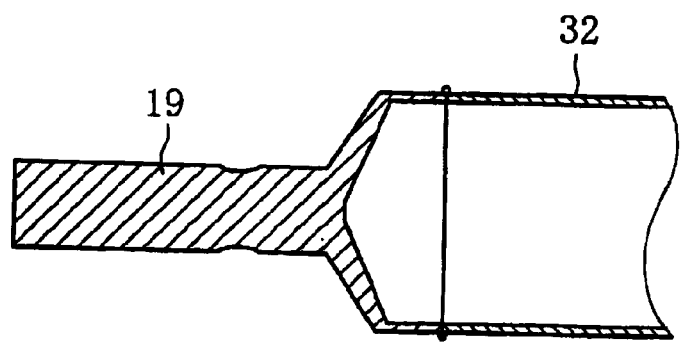
FIG. 14 is a cross-sectional view illustrating a stub shaft, closer to the universal joint, having a tube coupled thereto.
Figure 15:
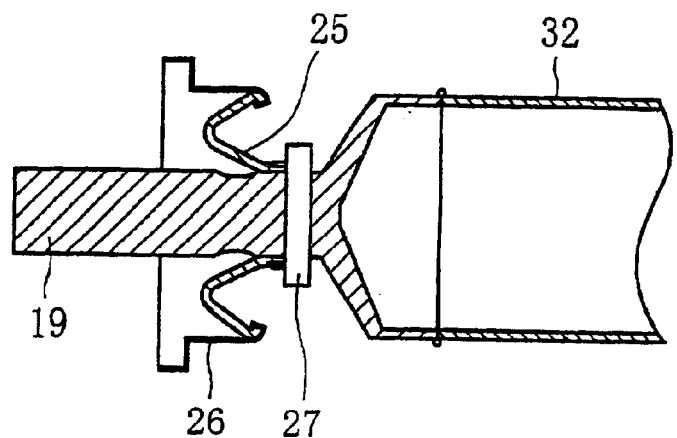
FIG. 15 is a cross-sectional view illustrating the stub shaft of FIG. 14 with a boot, a boot adapter, and a boot belt being attached thereto.
Figure 16:
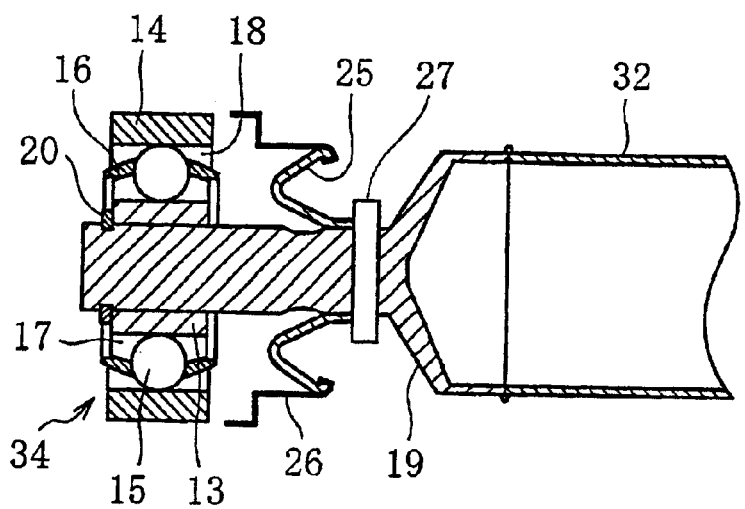
FIG. 16 is a cross-sectional view illustrating the stub shaft of FIG. 15, having a joint assembly being mounted thereto.
Figure 17:
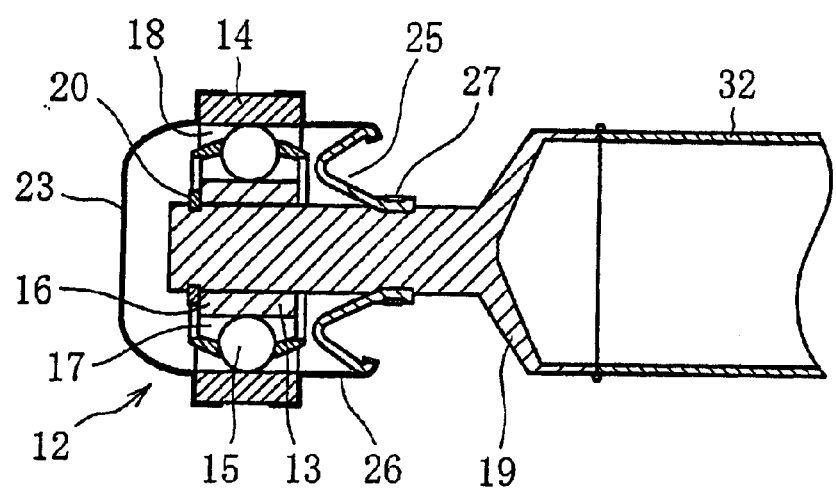
FIG. 17 is a cross-sectional view illustrating the joint assembly of FIG. 16, having a boot and an end cap attached thereto.
Figure 18:
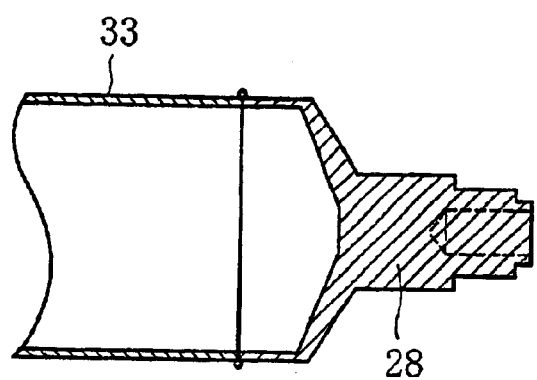
FIG. 18 is a cross-sectional view illustrating a stub shaft, closer to a companion flange, having a tube coupled thereto.
Figure 19:
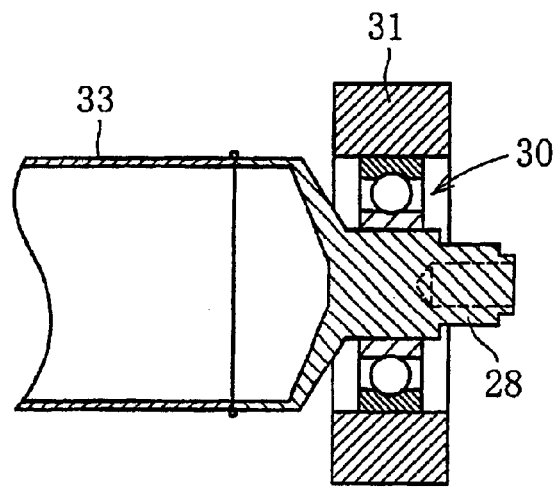
FIG. 19 is a cross-sectional view illustrating the stub shaft of FIG. 18 with a ball bearing mounted thereto.
Figure 20:
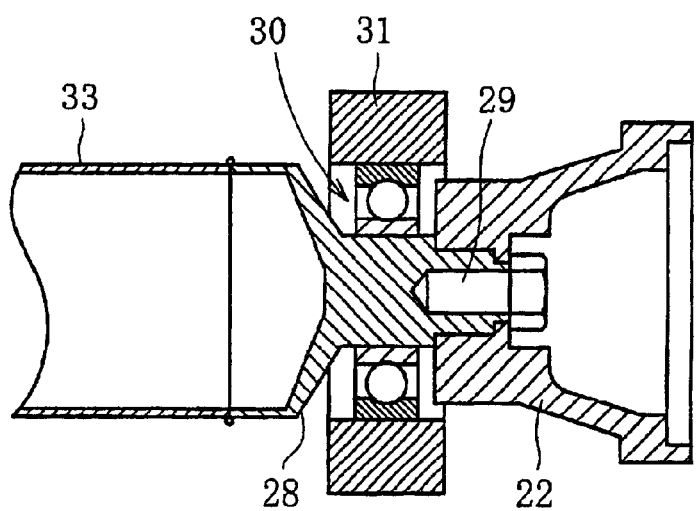
FIG. 20 is a cross-sectional view illustrating the stub shaft of FIG. 19 with a companion flange mounted thereto.
Figure 21:
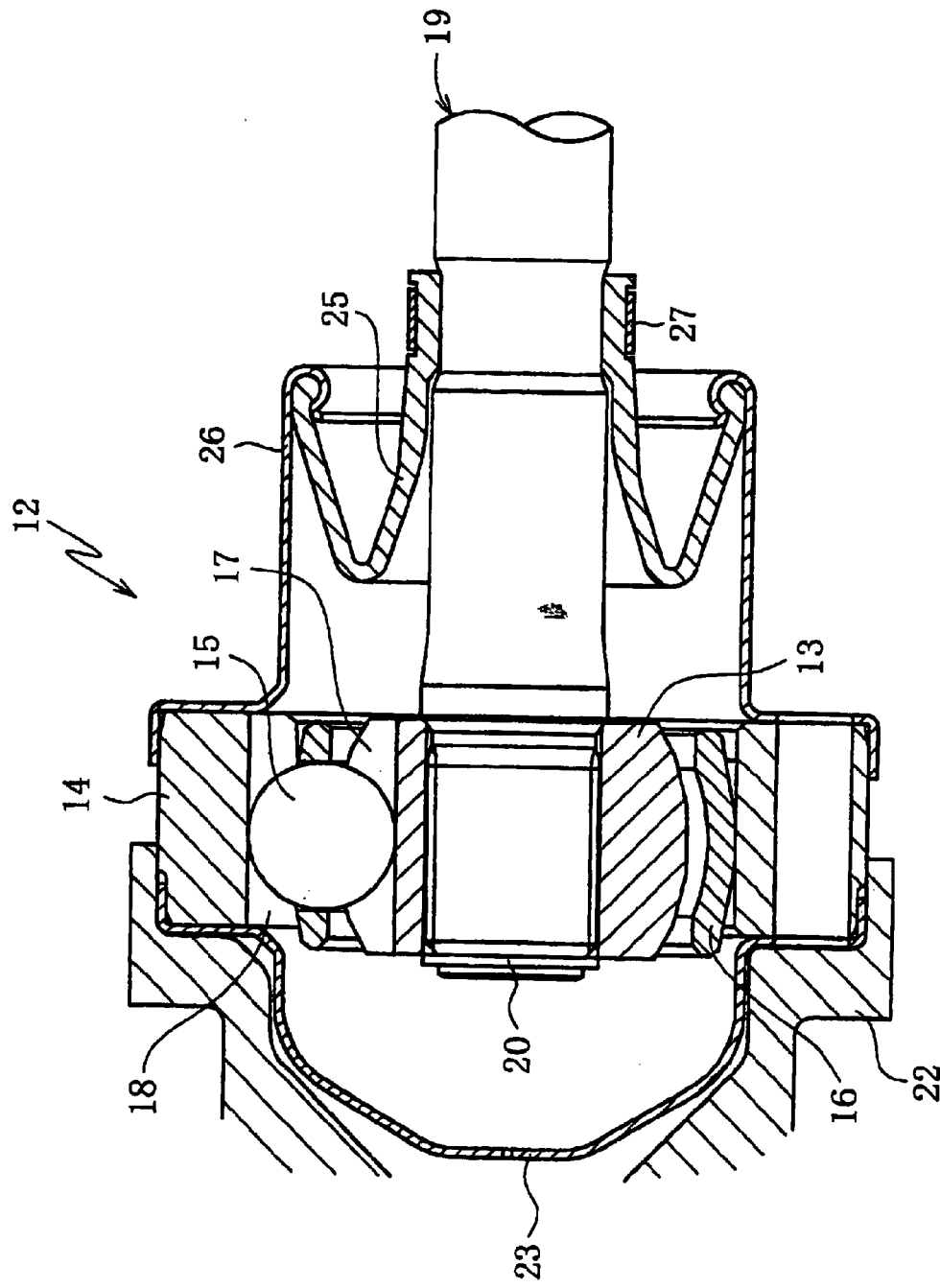
FIG. 21 is a cross-sectional view illustrating another exemplary prior-art constant velocity universal joint for use with a propeller shaft.

In this embodiment, the propeller shaft is used as a rear propeller shaft 6 that is designed to accommodate variations in length and angle caused by changes in relative position between a transmission 2 and a rear differential gear 7 in an FR-based 4WD vehicle (see FIG. 12). In addition, the propeller shaft can also be employed as a front propeller shaft 3 disposed between the transmission 2 and a front differential gear 4 in a 4WD vehicle, as well as a propeller shaft disposed between a transmission and a differential gear in an FR vehicle. In the drive system of a 4WD vehicle shown in FIG. 12, the output of an engine 1 is transmitted, through the transmission 2, from the front differential gear 4 to front wheels 5 via the front propeller shaft 3 on one hand, and from the rear differential gear 7 to rear wheels 8 via the rear propeller shaft 6 on the other hand.

Figure 1:
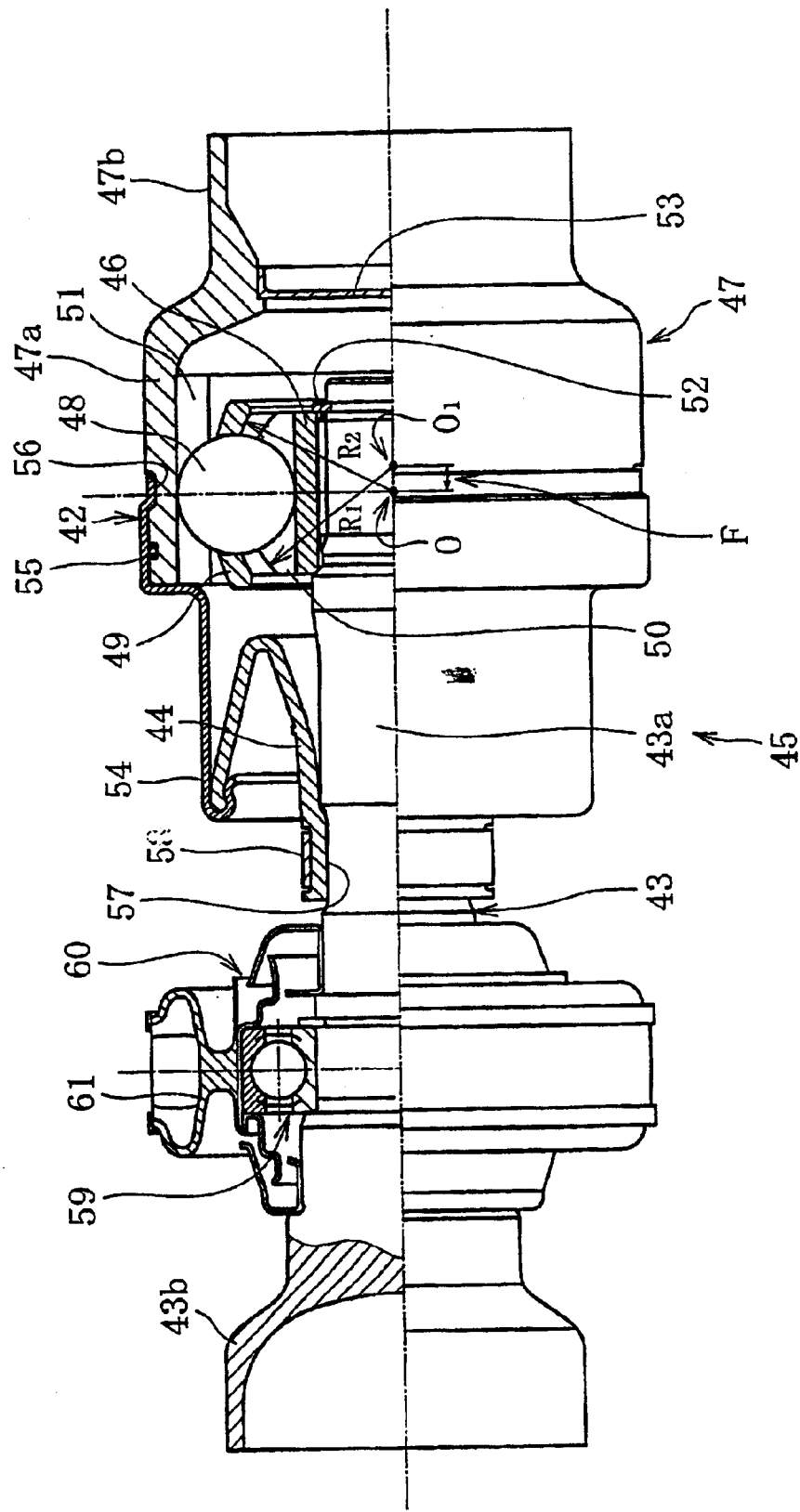
FIG. 1 is a partially cross-sectional front view illustrating a unit that forms a propeller shaft according to an embodiment of the present invention.

As shown in FIG. 1, the propeller shaft according to this embodiment is equipped with a unit 45 having a main portion that comprises a Lobro-type constant velocity universal joint (LJ) 42, a stub shaft 43, and a boot 44. On the other hand, the constant velocity universal joint 42 has a main portion comprising an inner ring 46, an outer ring 47, balls 48, and a cage 49.

The inner ring 46 has a plurality of track grooves 50 formed on its convex spherical outer peripheral surface. The stub shaft 43 is fitted into the hole formed at the center of the inner ring 46 to mate with each other by the serrations that are formed on the inner peripheral surface of the hole and the outer peripheral surface of the stub shaft 43, thereby making it possible to transmit torque. A snap ring 52 installed in an annular groove of the stub shaft 43 causes the stub shaft 43 to be fixedly positioned onto the inner ring 46 in the axial direction. To mate the inner ring 46 with the stub shaft 43, the stub shaft 43 is inserted into the inner ring 46 until the base of the serrations on the stub shaft 43 is reached, with the inner ring 46 being supported with a jig (not shown). Finally, the snap ring 52 is installed from the bottom of the outer ring 47. In addition, the curvature center $O_1$ of the outer peripheral surface of the inner ring 46 is offset axially by an equal distance (F) from each other with respect to the center of the ball O (the center of the joint). The radius $R_2$ of the concave spherical inner peripheral surface of the cage 49 is set to be the same as the radius $R_1$ of the outer peripheral surface of the inner ring 46.

The outer ring 47, disposed on the outer periphery of the inner ring 46, is provided on the cylindrical inner peripheral surface thereof with the same number of track grooves 51 as that of the track grooves 50 of the inner ring 46. The track grooves 50 of the inner ring 46 and the track grooves 51 of the outer ring 47 form angles with the axial line in directions opposite to each other. The ball 48 is incorporated into an intersecting portion between the track groove 50 of the inner ring 46 and the track groove 51 of the outer ring 47, which are paired with each other. The cage 49 is disposed in an annular space between the inner ring 46 and the outer ring 47, with the ball 48 being held inside the pocket of the cage 49. The outer ring 47 comprises a cup-shaped enlarged diameter portion 47a and a hollow reduced diameter portion 47b, which are integrally molded. The enlarged diameter portion 47a accommodates the inner ring related parts that comprise inner ring 46, the cage 49, and the balls 48, while the reduced diameter portion 47b extends axially from the enlarged diameter portion 47a. The outer ring 47 is configured to have an end cap 53 that is press fitted into the inner periphery of the boundary between the enlarged diameter portion 47a and the reduced diameter portion 47b. The end cap 53 serves to prevent leakage of grease filled in the constant velocity universal joint 42 as well as intrusion of foreign material.

Figure 2:
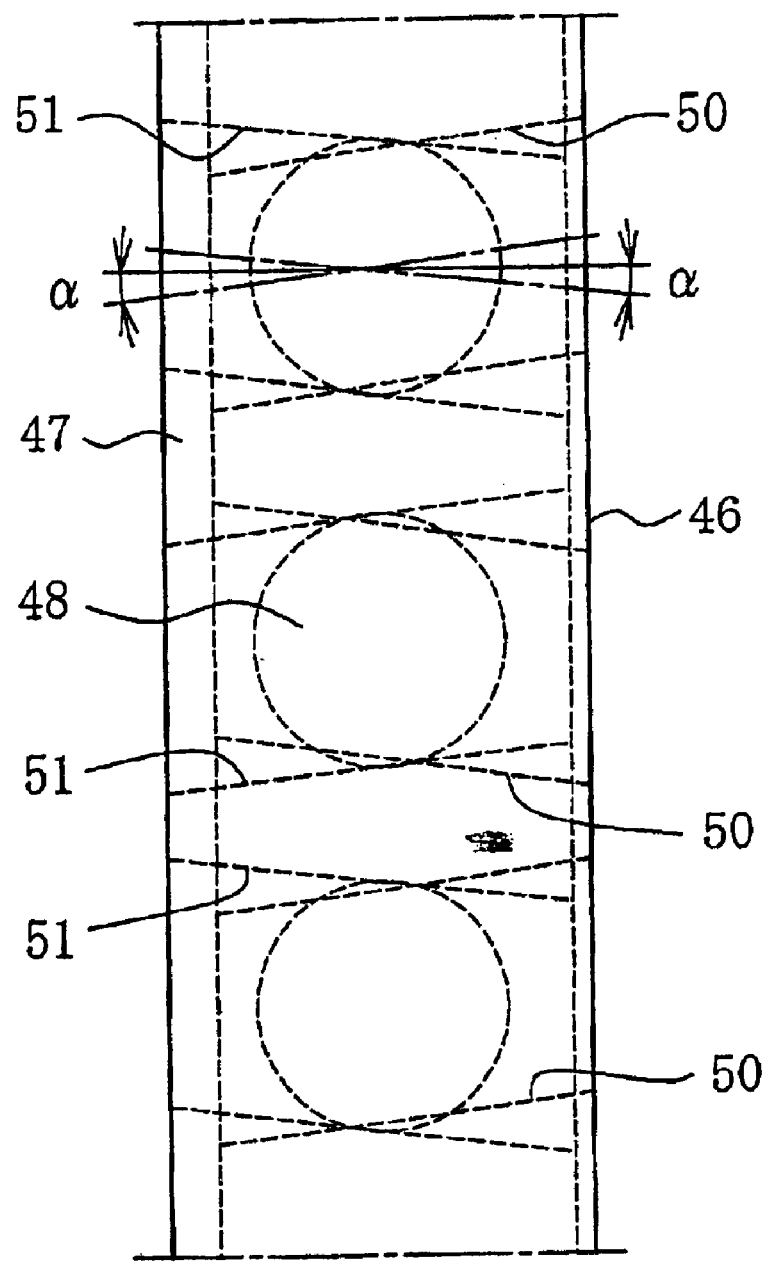
FIG. 2 is an explanatory plan view illustrating a track crossing angle α in a constant velocity universal joint that forms the unit of FIG. 1.
Figure 3:
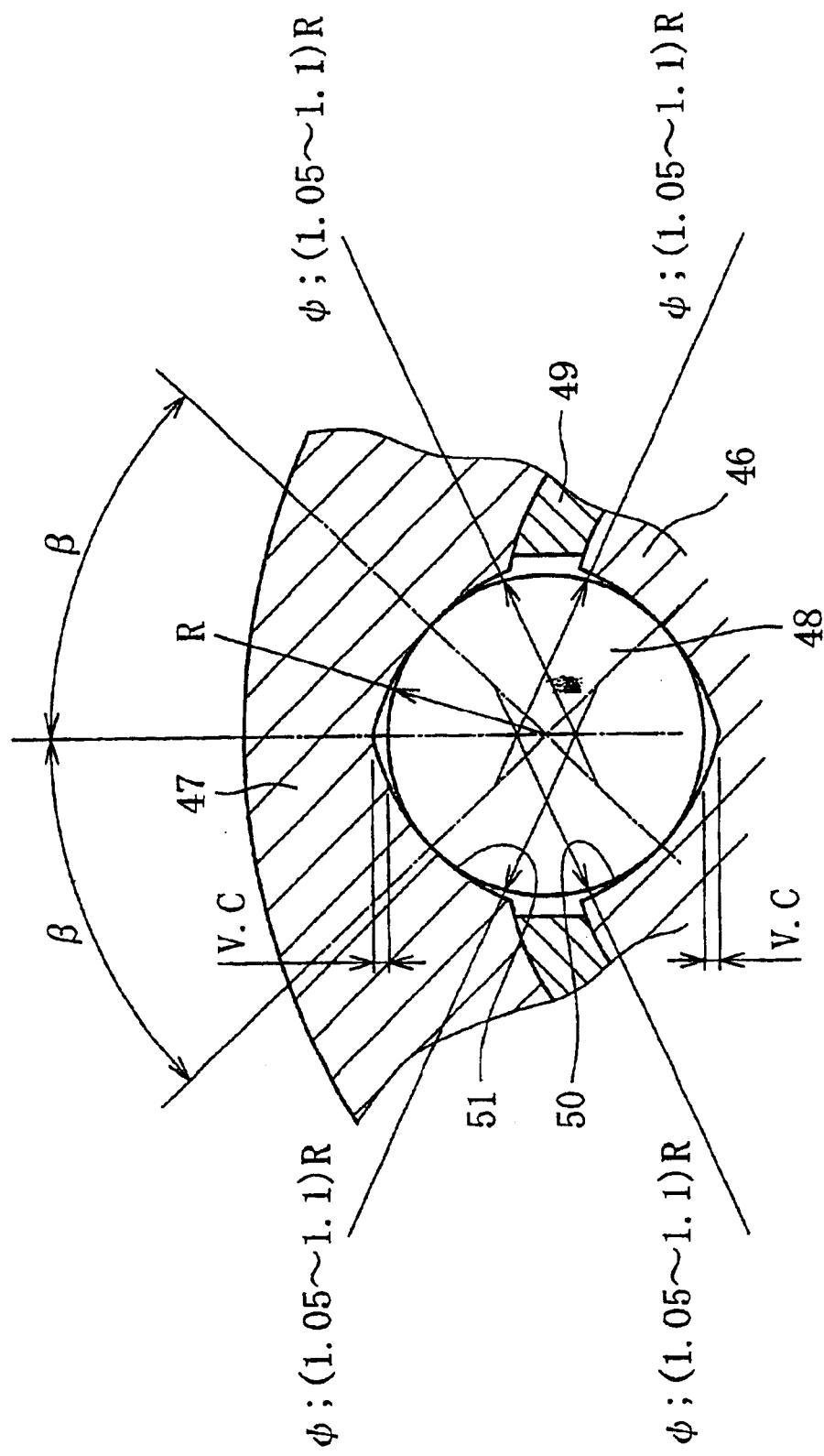
FIG. 3 is an explanatory enlarged cross-sectional view illustrating a track contact angle β in the constant velocity universal joint that forms the unit of FIG. 1.

As shown in FIG. 2, the angle of each of the track grooves 50, 51 formed with the axial line (hereinafter referred to as a track crossing angle) is indicated by symbol $\alpha$. In addition, as shown in FIG. 3, the track grooves 50, 51 have a Gothic arched shape in cross section, and thus are in angular contact with the balls 48 at a predetermined contact angle ($\beta$, hereinafter referred to as the track contact angle).

The Lobro-type constant velocity universal joint has a limit operating angle that depends by its structure on the track crossing angle $\alpha$ and the track contact angle $\beta$. When operated at greater than the limit operating angle, the Lobro-type constant velocity universal joint is generally known to cause abnormal frictions and noises. However, since a constant velocity universal joint for use with a propeller shaft is used for rotations at high speeds, its practical maximum operating angle is restricted to 10 to 13 degrees due to a sticking problem caused by heat.

In this context, a preferred Lobro-type constant velocity universal joint (LJ) for use with a propeller shaft is designed such-that with a practical maximum operating angle of 10 to 13 degrees for the inner ring 46 and the outer ring 47, the track contact angle $\beta$ is 35 to 45 degrees, while the track crossing angle $\alpha$ is 7 to 12 degrees for the track grooves 50 of the inner ring 46 and the track grooves 51 of the outer ring 47.

There is also interposed a sealing device between the outer ring 47 and the stub shaft 43. The sealing device comprises the boot 44 and a metallic boot adapter 54. The boot 44, having a reduced-diameter end portion and an enlarged-diameter end portion, is folded over at the middle in the shape of a letter V in cross section. The boot adapter 54, cylindrical in shape, has at one end a flange portion that fits over the open-end outer peripheral surface of the outer ring 47 via an O-ring 55, and is fixed to the outer ring 47 by crimping the end portion of the flange in a groove 56 of the outer ring 47.

On the other hand, the stub shaft 43 comprises a shaft portion 43a and an enlarged diameter portion 43b, which are integrally molded. The shaft portion 43a is serrated at end portion to mate with the inner ring 46, while the enlarged diameter portion 43b, having a cup-shaped portion that extends axially from the shaft portion 43a, is configured to have a hollow portion. The reduced-diameter end portion of the boot 44 is attached to a boot groove 57 provided on the shaft portion 43a of the stub shaft 43 and then fastened-with a boot belt 58.

There is a sealing deep-groove ball bearing or a ball bearing 59 (a support bearing) that is fitted over the stub shaft 43 between the enlarged diameter portion 43b and the mounting portion of the reduced-diameter end portion of the boot 44. There is provided a dust seal 60 between the stub shaft 43 and the ball bearing 59, which is mounted to the vehicle body via a mounting member 61 to rotatably support the stub shaft 43. The mounting member 61, formed of an elastic material such as rubber, is adapted to alignably supports the ball bearing 59. On the other hand, the dust seal 60, provided on both axial sides of the ball bearing 59, serves to prevent intrusion of dust or the like into the ball bearing 59.

Figure 4:
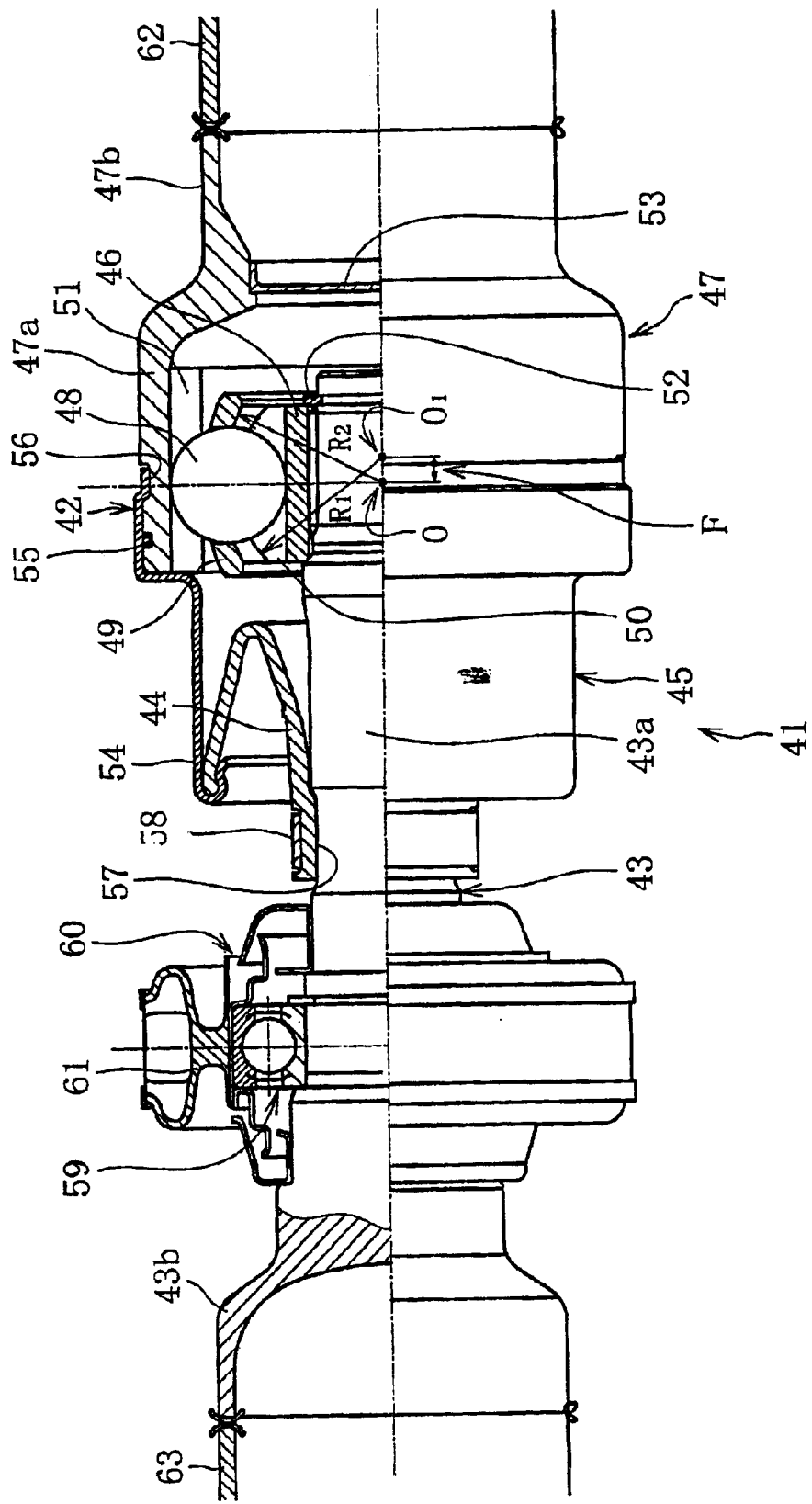
FIG. 4 is a partially cross-sectional front view illustrating the propeller shaft with the unit of FIG. 1 having tubes coupled to its both axial ends.

As described above, the unit 45 is made up of the constant velocity universal joint 42 with the inner ring 46, the outer ring 47, the cage 49, and the balls 48, the stub shaft 43, the boot 44, and the ball bearing 59 (including the mounting member 61 and the dust seal 60). As described above, the constant velocity universal joint 42, the stub shaft 43, the boot 44, and the ball bearing 59 are pre-assembled into the unit. As shown in FIG. 4, this makes it possible to complete a propeller shaft 41 only by attaching the constant velocity universal joint 42 to the unit 45 at both axial ends thereof via coupling shaft members.

For example, an end of tubes 62, 63 or coupling shaft members is coupled by friction to both the axial ends of the unit 45, that is, to the open end of the reduced diameter portion 47b of the outer ring 47 and the open end of the enlarged diameter portion 43b of the stub shaft 43, respectively. A constant velocity universal joint or the like is coupled to the other end of the one tube 62 as well as to the other end of the other tube 63, thereby forming the propeller shaft 41 of a triple joint type. With the arrangement of the unit 45, the boot 44 is disposed opposite to the connection provided by the friction coupling between the outer ring 47 and the tube 62, thereby making it possible to prevent the boot 44 from being adversely affected by heat.

On the other hand, an end of a tube may be coupled only to any one of the axial ends of the unit 45 with a constant velocity universal joint being coupled to the other end of the tube, thereby forming a propeller shaft of a double joint type. Constant velocity universal joints to be coupled to the other end of the tube include sliding constant velocity universal joints such as a Lobro-type constant velocity universal joint (LJ), a double-offset constant velocity universal joint (DOJ), or a tripod constant velocity universal joint (TJ). In addition to those of the sliding type, included are fixed-type constant velocity universal joints such as a Rzeppa-type constant velocity universal joint (BJ). A constant velocity universal joint provided on one end of the propeller shaft is coupled to the transmission as well as a constant velocity universal joint provided on the other end thereof is coupled to a differential gear, thereby mounting the propeller shaft to the vehicle body.

Figure 5:
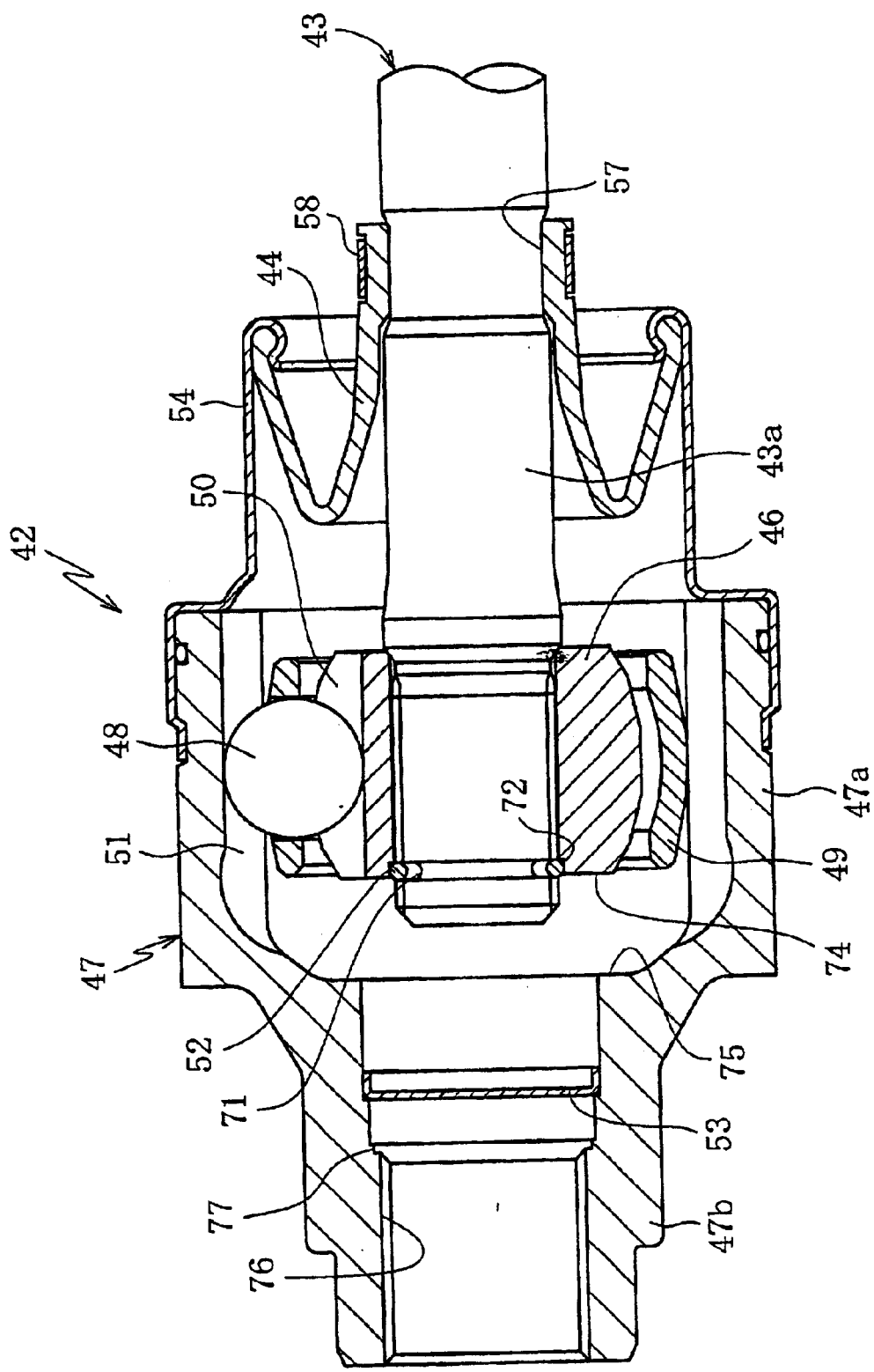
FIG. 5 is a cross-sectional view illustrating a constant velocity universal joint for use with the propeller shaft according to an embodiment of the present invention.
Figure 6:
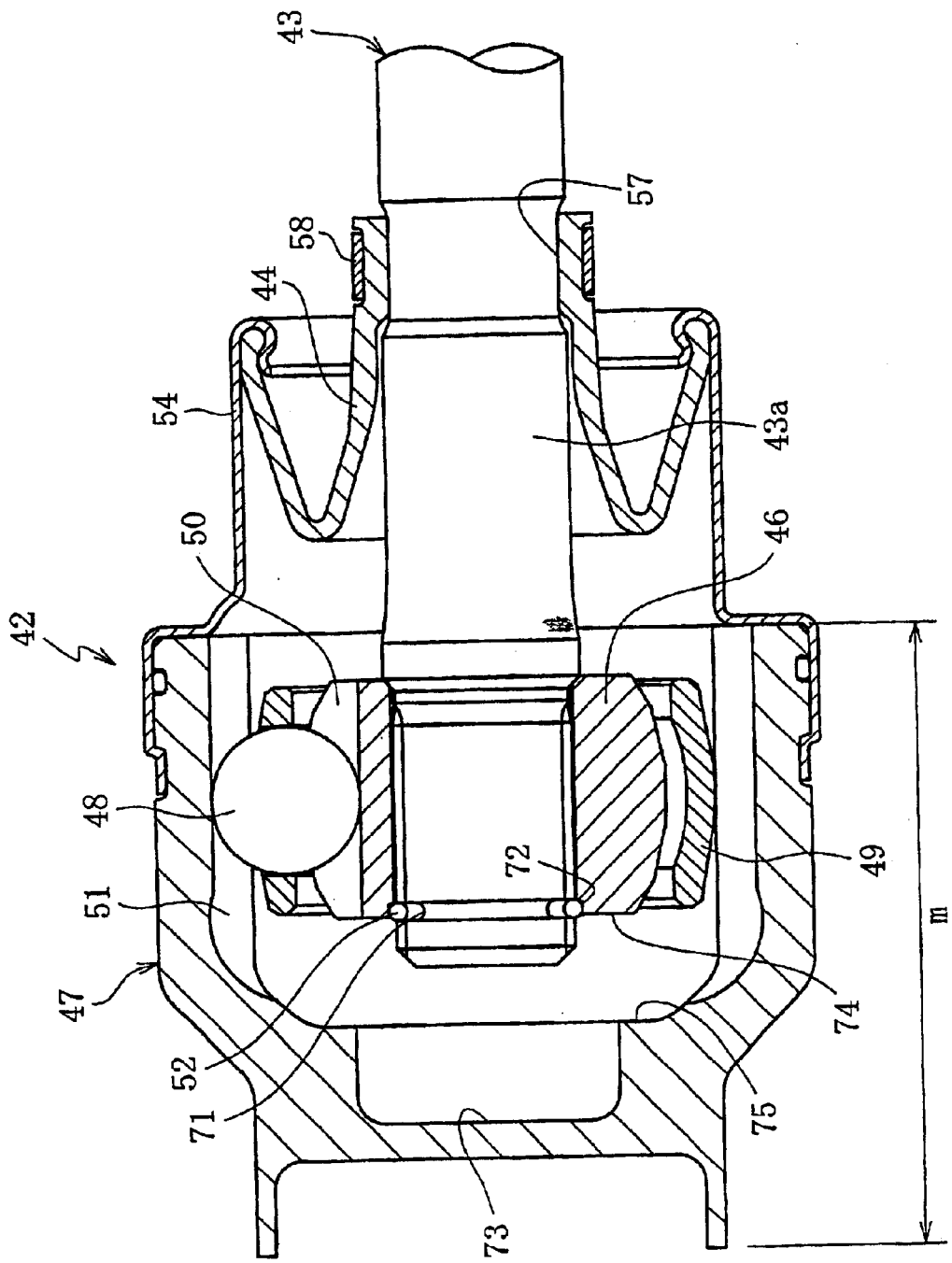
FIG. 6 is a cross-sectional view illustrating a constant velocity universal joint for use with the propeller shaft according to another embodiment of the present invention.

FIG. 5 is a Lobro-type constant velocity universal joint of a non-floating type according to another embodiment, and FIG. 6 is another Lobro-type constant velocity universal joint having an outer ring 47 that is different in shape from that of FIG. 5. The shaft portion 43a of the stub shaft 43 is fitted into the hole formed at the center of the inner ring 46 according to these embodiments to mate with each other by the serrations that are formed on the inner peripheral surface of the hole and the outer peripheral surface of the shaft portion 43a of the stub shaft 43, thereby making it possible to transmit torque. For example, the snap ring 52, which is circular in cross section, radially compressible, and provided with ends, is installed on the shaft end portion of the stub shaft 43, thereby allowing the snap ring 52 to fixedly position the stub shaft 43 in the inner ring 46 in the axial direction. In other words, the stub shaft 43 is provided, on the shaft end portion thereof, with an annular groove 71, while the inner ring 46 is provided, on the end portion thereof, with a stepped portion 72 opposite to the annular groove 71, thereby creating an annular space defined by the annular groove 71 and the stepped portion 72, in which the snap ring 52 is installed.

In the embodiment shown in FIG. 5, the outer ring 47 comprises a cup-shaped enlarged diameter portion 47a and a hollow reduced diameter portion 47b, which are integrally molded. The enlarged diameter portion 47a accommodates the inner ring related parts that comprise the inner ring 46, the cage 49, and the balls 48, while the reduced diameter portion 47b extends axially from the enlarged diameter portion 47a. The outer ring 47 is configured to have the end cap 53 that is press fitted into the inner periphery of the boundary between the enlarged diameter portion 47a and the reduced diameter portion 47b. The end cap 53 serves to prevent leakage of grease filled in the constant velocity universal joint 42 as well as intrusion of foreign material.

The outer ring 47 according to the embodiment shown in FIG. 6 is different from that of the embodiment shown in FIG. 5 in having no hollow reduced diameter portion 47b that extends axially from the enlarged diameter portion 47a. On the bottom of the outer ring 47, formed is a recessed portion 73 for accommodating the shaft end portion of the stub shaft 43 upon press fitting the stub shaft 43 into the inner ring 46.

The following steps are performed to assemble the constant velocity universal joint 42. First, after the boot 44 and the boot adapter 54 have been inserted over the stub shaft 43 closer to the constant velocity universal joint, the stub shaft 43 is inserted into the open end portion of the outer ring 47 to press fit the shaft portion 43a of the stub shaft 43 into the inner ring 46 provided in the assembly in which the inner ring 46, the cage 49, and the balls 48 have been incorporated into the outer ring 47. Thus, in this step, the serrations formed on the outer peripheral surface of the shaft portion of the stub shaft 43 mate with those formed on the inner peripheral surface of the inner ring 46.

Upon press fitting the stub shaft 43 into the inner ring 46, the snap ring 52 is installed into the annular groove 71 on the shaft end portion of the stub shaft 43. The snap ring 52 is compressed radially while being pushed into the hole of the inner ring 46 and then springs out into the stepped portion 72 of the inner ring 46 upon reaching the stepped portion 72, thereby allowing the stub shaft 43 to be axially fixed with respect to the inner ring 46. After the boot adapter 54 is then press fitted over the outer ring 47 provided in the assembly, the reduced-diameter end portion of the boot 44 is placed into the boot groove 57 of the stub shaft 43 and then fixedly fastened with the boot belt 58.

Figure 7:
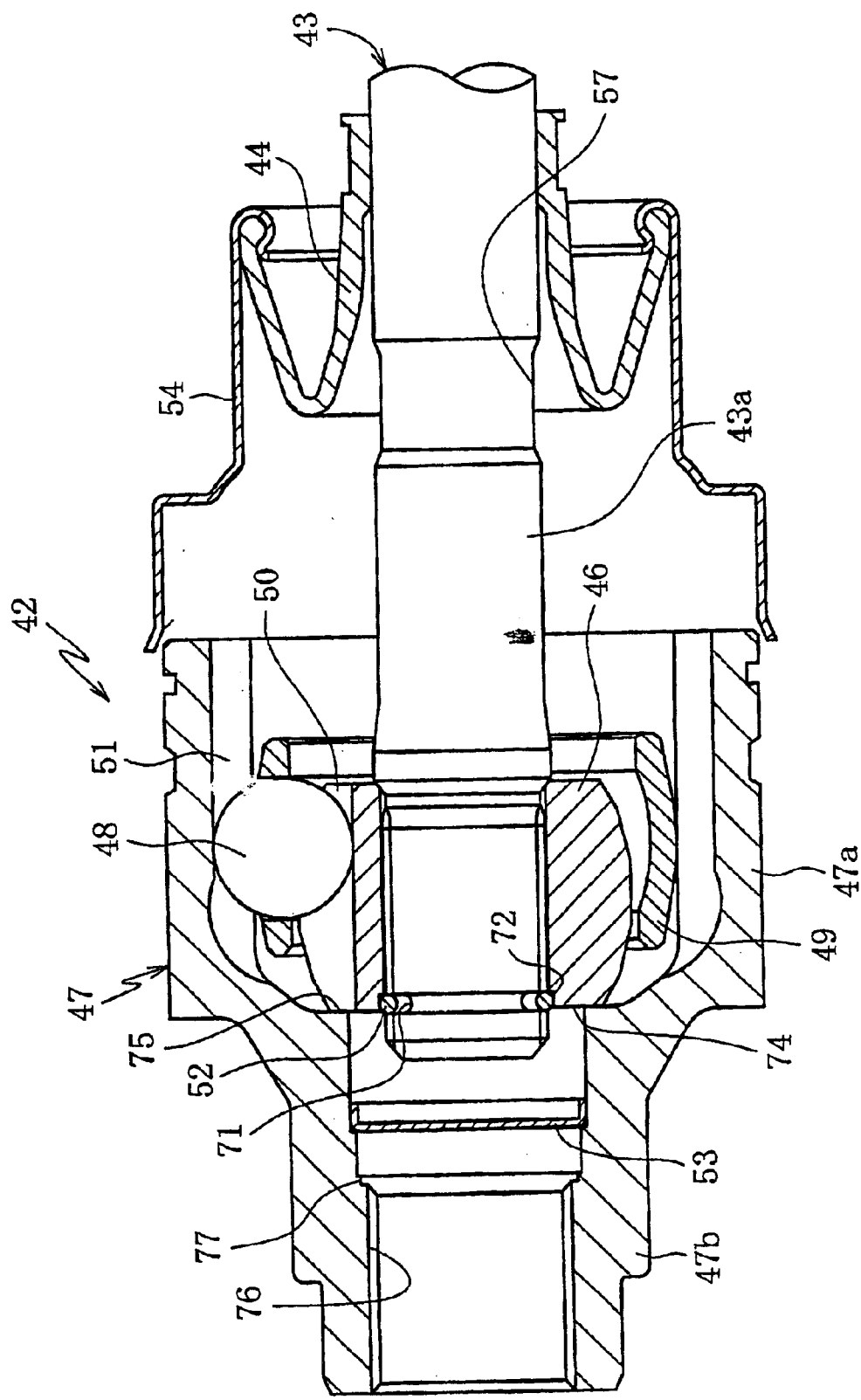
FIG. 7 is a cross-sectional view illustrating a stub shaft being press fitted in the step of assembling the constant velocity universal joint of FIG. 5.
Figure 8:
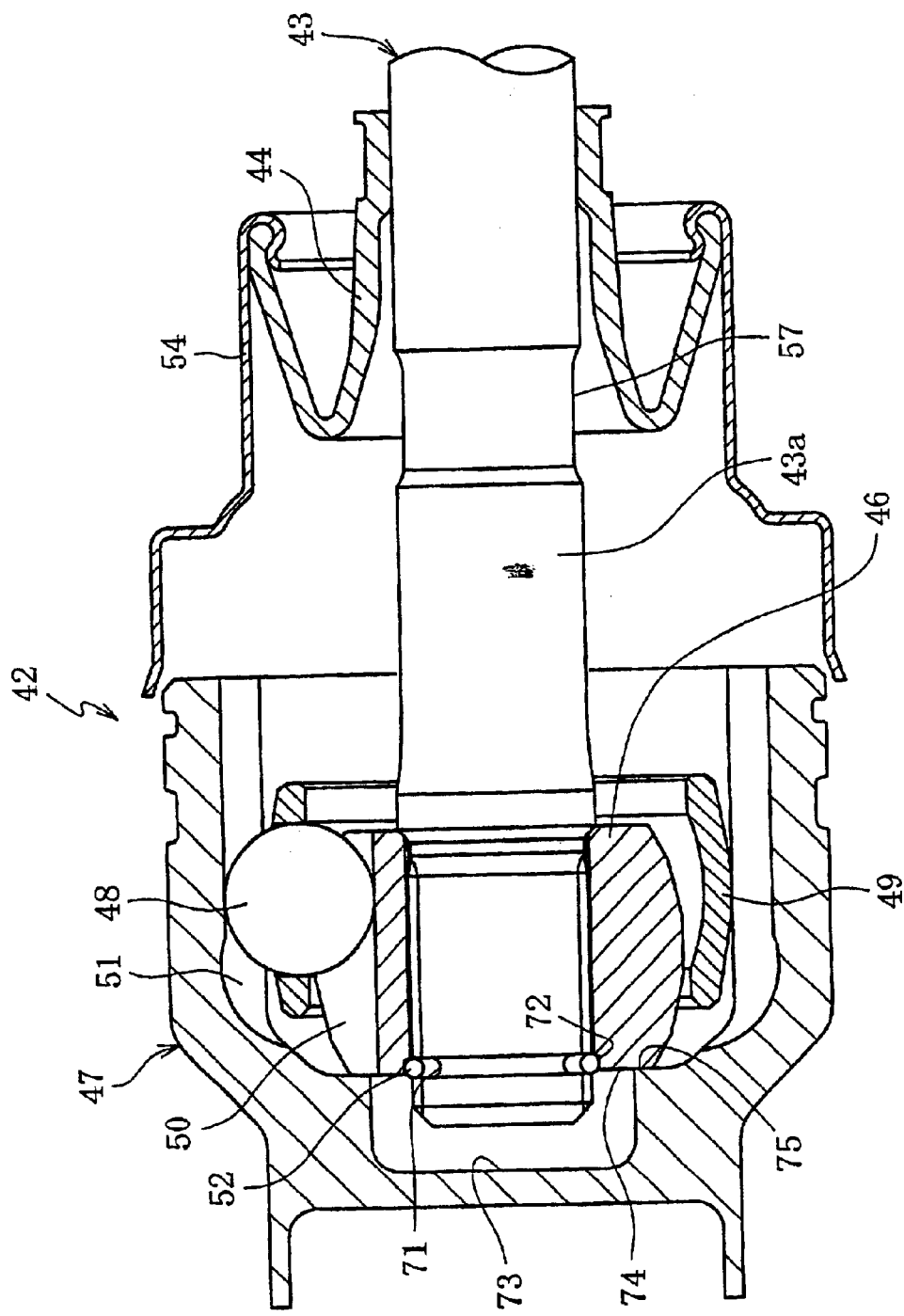
FIG. 8 is a cross-sectional view illustrating the stub shaft being press fitted in the step of assembling the constant velocity universal joint of FIG. 6.

As shown in FIGS. 7 and 8, press fitting the stub shaft 43 into the inner ring 46 causes the inner ring related parts such as the inner ring 46, the balls 48, and the cage 49 to move farther into the outer ring 47. However, before the balls 48 and the cage 49 are interfered, a distal end surface 74 of the inner ring 46 abuts the bottom 75 of the outer ring 47, thereby preventing the inner ring related parts from being moved farther axially. Since this allows the stub shaft 43 to be press fitted into the inner ring 46 with the inner ring 46 being supported by the bottom 75 of the outer ring 47, the press fitting will not cause an excessive force to be applied between the balls 48 and the cage 49. The shaft end portion of the stub shaft 43 is accommodated in the hole formed in the reduced diameter portion 47b of the outer ring 47 in the case of the embodiment of FIG. 5, while accommodated in the recessed portion 73 formed at the bottom 75 of the outer ring 47 in the case of the embodiment of FIG. 6.

In the case of the embodiment of FIG. 5, there are provided serrations 76 on the inner peripheral surface of the hole formed in the reduced diameter portion 47b of the outer ring 47. The shaft portion of a stub shaft (not shown) is allowed to mate with the hole of the reduced diameter portion 47b in a manner such that the serrations 76 formed on the inner peripheral surface of the hole mate with those formed on the outer peripheral surface of the shaft portion of the stub shaft, thereby enabling torque transmission.

For example, like the aforementioned structure for fixing the stub shaft 43 to the inner ring 46, a snap ring is installed on the shaft end portion of the stub shaft that has mated by serrations with the reduced diameter portion 47b of the outer ring 47, thereby allowing the snap ring to fixedly position the stub shaft in the outer ring 47 in the axial direction. That is, an annular groove is formed on the shaft end portion of the stub shaft as well as a stepped portion 77 is formed opposite to the annular groove on the serrations end portion of the outer ring 47 in order to accommodate the snap ring in the annular space defined by the annular groove and the stepped portion 77.

Although not illustrated, the reduced diameter portion 47b of the outer ring 47 is connected with a tube via the aforementioned stub shaft (not shown) as well as the stub shaft 43 in the inner ring 46 is connected with a tube. One of the tubes is coupled to the transmission via the constant velocity universal joint while the other tube is coupled to the differential gear via the constant velocity universal joint, thereby incorporating the propeller shaft into a vehicle.

Figure 9:
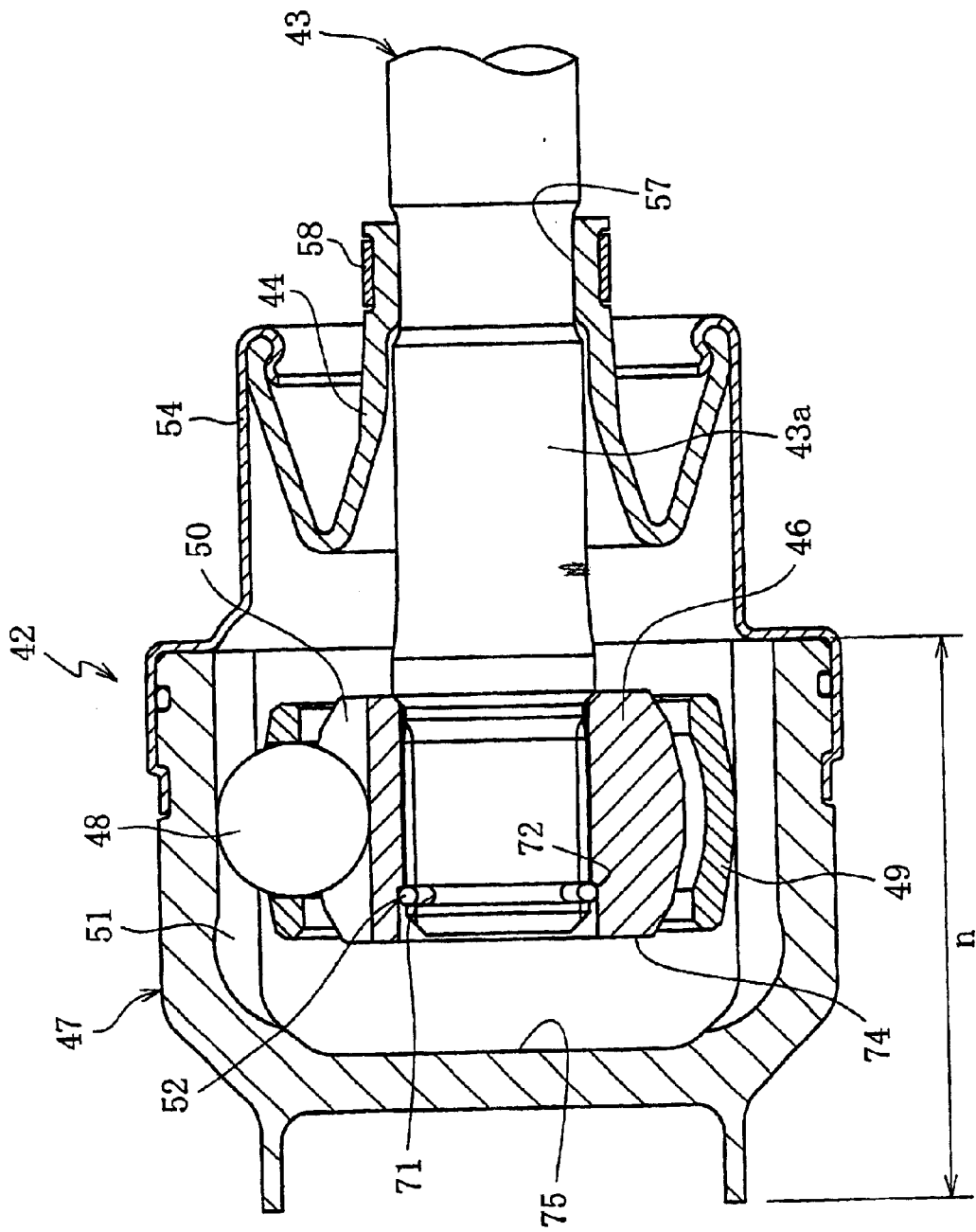
FIG. 9 is a cross-sectional view illustrating a constant velocity universal joint or an improved version of the constant velocity universal joint of FIG. 6 according to another embodiment.

FIG. 9 shows another embodiment having an outer ring 47 that is different in shape from that of the embodiment of FIG. 6. In this embodiment, the stepped portion 72 of the inner ring 46, disposed opposite to the annular groove 71 on the shaft end portion of the stub shaft 43, is formed at a position where the shaft end portion of the stub shaft 43 does not protrude from the distal end surface 74 of the inner ring 46.

Figure 10:
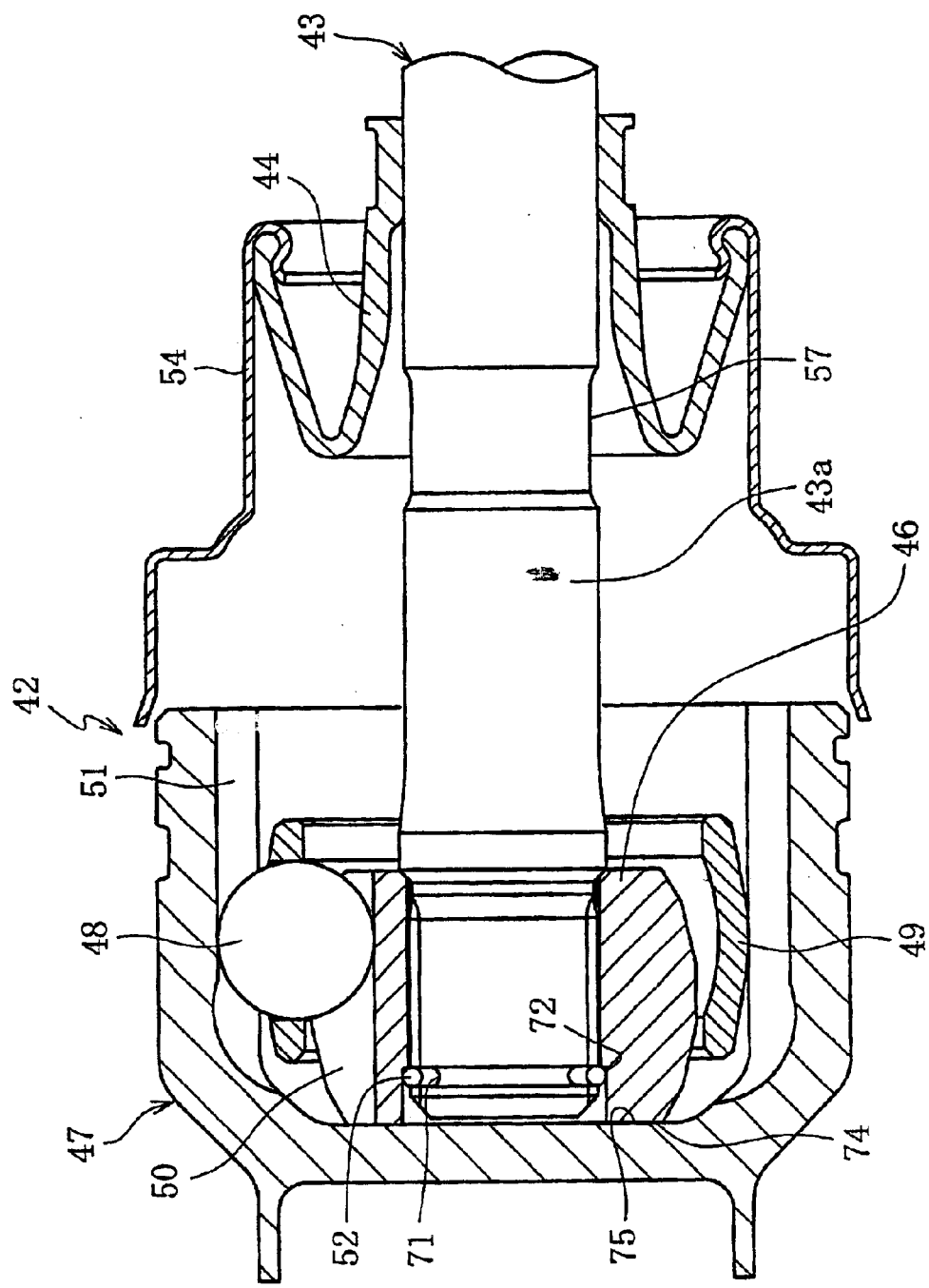
FIG. 10 is a cross-sectional view illustrating a stub shaft being press fitted in the step of assembling the constant velocity universal joint of FIG. 9.

As shown in FIG. 10, when the stub shaft 43 press fitted into the inner ring 46, before the inner ring related parts such as the inner ring 46, the balls 48, the cage 49 move farther into the outer ring 47 until interfered, the distal end surface 74 of the inner ring 46 abuts the bottom 75 of the outer ring 47, thereby preventing the inner ring related parts from being moved farther axially. Since the shaft end portion of the stub shaft 43 does not protrude from the distal end surface 74 of the inner ring 46, the bottom 75 of the outer ring 47 can be made flat. Consequently, the outer ring 47 can be simplified in its outer shape and thereby reduced in cost. In addition, since the recessed portion 73 needs not to be formed, when compared to the outer ring 47 of the embodiment of FIG. 6, the total length (n<m (see FIGS. 6 and 9)) of the outer ring 47 can be made shorter thereby making it possible to reduce its weight, size, and cost.

Figure 11:
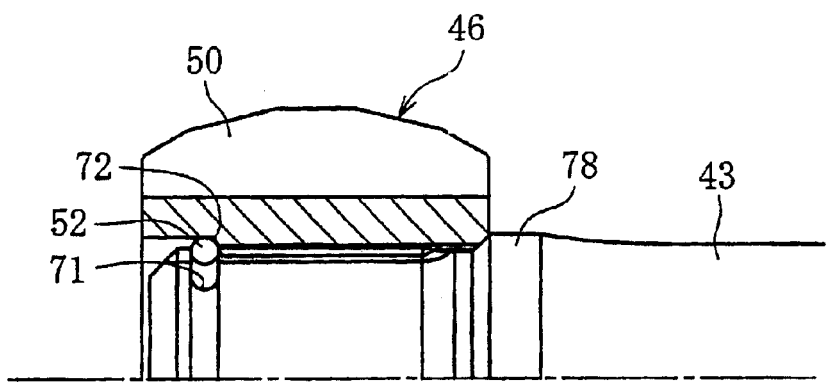
FIG. 11A is an enlarged cross-sectional view illustrating the main portion of FIG. 9, FIG. 11B a cross-sectional view illustrating a modified example of the structure of FIG. 11A, and FIG. 11C a cross-sectional view illustrating a modified example of the structure of FIG. 11B.
Figure 11:
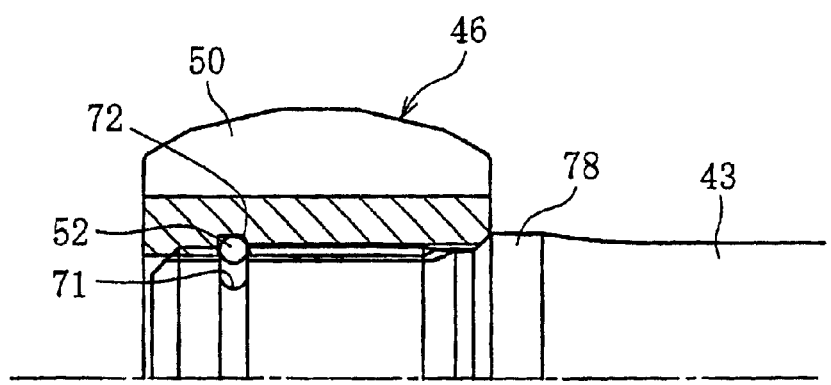
Figure 11:
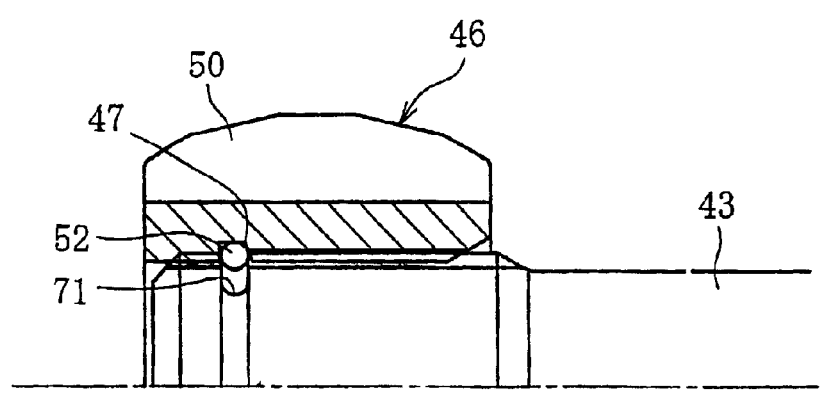

To form the stepped portion of the inner ring 46 at a position where the shaft end portion of the stub shaft 43 does not protrude from the distal end surface 74 of the inner ring 46, the stepped portion 72 of the inner ring 46 may be countersunk deep in the axial direction, as shown in FIG. 11A. Alternatively, As shown in FIGS. 11B and 11C, the stepped portion 72 of the inner ring 46 may be formed as part of the annular groove that is provided closer to the center of the inner diameter surface of the inner ring 46. The example of FIG. 11B is different from that of FIG. 11C in that the stub shaft 43 of FIG. 11B has a shoulder 78, for preventing play between the inner ring 46 and the stub shaft 143, at the portion corresponding to an end portion of the inner ring 46.

In the Lobro-type constant velocity universal joint of the aforementioned embodiments, the ball 48 is made of a heat resisting steel and tempered after having been quenched or subjected to a carbonitriding treatment, and has a surface hardness of 58 or more in HRC and the maximum size of a carbon grain 8 $\mu$m or less after having been tempered.

The heat resisting steel or a material of the ball 48 has the content of alloy elements by mass of 0.6% to 1.3% of C, 0.3% to 3.0% of Si, 0.2% to 1.5% of Mn, 0.03% or less of P, 0.03% or less of S, 0.3% to 5.0% of Cr, 0.1% to 3.0% of Ni, 0.050% or less of Al, 0.003% or less of Ti, 0.0015% or less of O, 0.015% or less of N, and the remainder of Fe and unavoidable impurities. The heat resisting steel with this chemical composition is tempered, for example, at temperatures of 200 to 300° C. to have a surface hardness of 58 or more in HRC. Each of the chemical elements included in the heat resisting steel of the ball 48 is limited as described above because of the following reasons.

(1) Carbon Content (0.6% to 1.3%)

Carbon is an essential element for ensuring the strength of the ball, which has to include 0.6% or more of C to maintain its predetermined hardness after having been subjected to a heat treatment. For this reason, the lower limit of C content is set at 0.6%. As described above, carbide is also highly responsible for the fatigue life of the ball. However, since it has been found that a C content of more than 1.3% cause large carbide grains to be produced and thereby shorten the fatigue life, the upper limit of C content is limited to 1.3%.

(2) Silicon Content (0.3% to 3.0%)

It is desirable to add silicon since it serves to prevent the ball from softening at high temperatures and improve its heat resistance. However, a Si content of less than 0.3% would not provide these effects, and therefore the lower limit of Si content is limited to 0.3%. The heat resistance is further improved as the Si content increases. However, since this effect would be saturated at contents of Si greater than 3.0% and even reduce hot workability or machinability, the upper limit of Si content is limited to 3.0%.

(3) Manganese Content (0.2% to 1.5%)

Manganese is used for deoxidization upon manufacturing steel and serves to improve quenchability. To obtain these effects, it is necessary to add 0.2% or more of Mn. The lower limit of Mn content is therefore limited to 0.2%. However, since machinability would be significantly reduced at contents of Mn greater than 1.5%, the upper limit of Mn content is limited to 1.5%.

(4) Phosphor Content (0.03% or less)

Phosphor segregates at boundaries between austenite grains in steel and would reduce toughness and rolling fatigue life. The upper limit of P content is therefore limited to 0.03%.

(5) Sulfur Content (0.03% or less)

Sulfur adversely affects the hot workability of steel and forms non-metallic inclusions in the steel, thereby reducing toughness and fatigue life. The upper limit of S content is therefore limited to 0.03%. On the other hand, although sulfur has the detriment as described above, it can serve to improve machinability. Accordingly, it is desirable to include as small an amount of sulfur as possible, however, it is even acceptable to include up to 0.005% of S.

(6) Chromium Content (0.3% to 5.0%)

Chromium plays a critical role in the present invention. It is added to improve quenchability, allowing carbide to ensure hardness and improve life. To obtain a predetermined carbide, it is necessary to add 0.3% or more of Cr. The lower limit of Cr content is therefore limited to 0.3%. However, at contents of Cr greater than 5.0%, large carbide grains are produced, reducing fatigue life. The upper limit of Cr content is thus limited to 5.0%.

(7) Aluminum Content (0.050% or less)

Aluminum is used for deoxidization upon manufacturing steel, however, it is desirable to include a reduced amount of Al since it causes hard oxide-based inclusions to be produced and thereby reduces fatigue life. It was also found that fatigue life was significantly reduced at contents of Al greater than 0.050%. The upper limit of Al content is thus limited to 0.050%. On the other hand, to include an Al content of less than 0.005%, higher costs would be required to manufacture steel. Therefore, it is desirable to set the lower limit of Al content at 0.005%.

(8) Titanium Content (0.003% or less), Oxygen Content (0.0015% or less), and Nitrogen Content (0.015% or less)

Titanium, oxygen, and nitrogen cause oxides and nitrides to be formed in steel as non-metallic inclusions, which cause fatigue fracture to start resulting in a reduction in fatigue life. Thus, the upper limit of each element is set at 0.03% of Ti, 0.0015% of O, and 0.015% of N.

(9) Nickel Content (0.1% to 3.0%)

Nickel plays a critical role in the present invention. In particular, when used at high temperatures, it prevents compositional structures from being changed in the development of fatigue and a reduction in hardness at high temperatures, thereby providing improved fatigue life. In addition to this, Nickel serves to improve toughness and thereby improve life in the presence of foreign materials as well as to improve corrosion resistance. For this reason, 0.1% or more of Ni have to be included, and thus the lower limit of Ni content is limited to 0.1%. However, at contents of Ni greater than 3.0%, a large amount of retained austenite would be produced after quenching, which makes it impossible to provide a predetermined hardness and increases the cost of steels. Thus, the upper limit of Ni content is limited to 3.0%.

Now, referred to below are the hardness of the ball 48 after tempering and carbide.

(10) Hardness After Tempering

In general, joints for use at high service temperatures are subjected to tempering at temperatures higher than the service temperatures to stabilize the size under service conditions. The present inventors have made studies on hardness after tempering and fatigue life at a temperature of 200° C. The studies show that there is a correlation between the hardness after tempering and the fatigue life, such that the fatigue life tends to become longer as the hardness after tempering becomes higher. In particular, with the same hardness after tempering, balls that have been tempered at higher temperatures have a longer life, and those balls of a higher hardness after tempering have a longer life when subjected to tempering at high temperatures. Furthermore, it has also been found that at hardness of below 58 in HRC after tempering, life tends to be suddenly reduced and widely varied. To improve life at high temperatures and reduce variations in life, it is necessary to maintain hardness at 58 or greater in HRC, and it is preferable in this case to employ as high temperatures as possible for tempering.

(11) Carbide

It has been found that carbides serve to maintain hardness of balls being tempered and prevent changes in compositional structure of the ball under development of fatigue, thereby providing improved fatigue life. At this time, a study was made on the maximum size of carbide grains at a depth of 0.1 mm from the surface of the ball and fatigue life. The study shows that the presence of a large carbide grain causes life to be reduced. More specifically, it has been found that the presence of a large carbide grain having a maximum size greater than 8 $\mu$m causes a sudden reduction in life to occur. For this reason, the maximum size of carbides was determined to be 8 $\mu$m.

More preferably, the heat resisting steel or a material of the ball 48 having the aforementioned chemical compositions further includes, by mass percent, at least one of Mo 0.05% or more and less than 0.25% and V 0.05% or more and 1.0% or less. This makes it possible to improve fatigue life in the presence of foreign materials and at high temperatures as well as hardness after tempering. These additional chemical components are limited for the following reasons.

(12) Molybdenum Content (0.05% or more and less than 0.25%)

Molybdenum serves to improve quenchability of steel and forms solid solutions in carbide to thereby prevent the steel from softening upon tempering. In particular, molybdenum is found to improve fatigue life at high temperatures and therefore employed. However, contents of Mo 0.25% or more would cause steel costs to increase and machinability to be significantly degraded due to no reduction in hardness during softening to facilitate machining. Thus, the content of Mo is limited to less than 0.25%. On the other hand, contents of Mo less than 0.05% would not serve to form carbide. Thus, the lower limit of Mo content is set at 0.05%.

(13) Vanadium Content (0.05% or more and 1.0% or less)

Vanadium bonds with carbon to precipitate fine carbide and stimulates the production of fine crystal grains to thereby improve strength and toughness. Inclusion of vanadium also improves the heat resistance of steels, prevents the steel from softening after tempering at high temperatures, improves rolling fatigue life, and reduces variations in life. These effects can be obtained at contents of V 0.05% or more, and therefore the lower limit of V content is set at 0.05%. However, at contents of V more than 1.0%, machinability and hot workability are reduced. Thus, the upper limit of V content is set at 1.0%.

According to a constant velocity universal joint with this arrangement for use with a propeller shaft, the heat resisting steel used as the material for the ball 48 has a good high-temperature size stability and high-temperature softening resistance, thus providing less change in size and less reduction in hardness at high temperatures when compared with conventional joints.

This allows the constant velocity universal joint to be improved in high-temperature size stability of the ball 48 when compared to prior-art joints, thereby making it possible to use the constant velocity universal joint at large values of N·θ. Furthermore, this allows for reducing the degree of reduction in hardness caused by tempering at high temperatures, thereby providing improved durability when compared to prior-art joints.

On the other hand, as shown in FIG. 3, the track grooves 50, 51 of the inner and outer rings 46, 47 are Gothic arched in shape as well as at least the ratio of the groove radius of curvature at a contact point between the track groove 50 of the inner ring 46 and the ball 48 to the radius R of the ball 48 is 1.05 to 1.10. In this example, the ratio of the groove radius of curvature at a contact point between the track groove 51 of the outer ring 47 and the ball 48 to the radius R of the ball 48 is 1.05 to 1.10 as well. However, the track grooves 50, 51 may be elliptical in shape instead of Gothic arched.

On the other hand, in these embodiments, various dimensions of the track grooves 50, 51 are different from those of prior art joints as shown in the table below. This allows the groove bottom to vertex clearance VC between the track grooves 50, 51 and the ball 48 to be 1.7 to 1.9 times that of prior-art joints, thereby making it possible to prevent the ball 48 from interfering with the bottom of the track grooves 50, 51 even under operating conditions at large values of N·θ. Furthermore, a clearance is provided on the bottom of the track grooves 50, 51 to allow a lubricant to stay thereon, thereby improving the performance of preventing temperatures from rising.

| Track dimensions | Joints of embodiments | Prior-art joints |
| --- | --- | --- |
| Contact ratio | 1.05~1.10 | (Below) 1.02~1.05 |
| Contact angle | 35~45° | 35~45° |
| VC ratio | 1.7~1.9 | 1.0 |

With Gothic arched track grooves 50, 51, the groove bottom to vertex clearance VC between the groove and ball is geometrically determined according to the ball radius r, the track-groove contact ratio (φ), and contact angle β. The groove bottom to vertex clearance VC becomes minimum at a smallest contact angle β and a smallest contact ratio φ, whereas VC becomes maximum at a largest contact angle β and a largest contact ratio φ. At a large contact ratio, the surface pressure of the inner surface of track grooves increases, however, an advantage is provided in preventing the contact ellipse from overrunning a track shoulder. Propeller shafts rotate at low torque and high speeds, thus causing no problem with the surface pressure of the track groove inner surface. Many constant velocity universal joints for use with a propeller shaft have advantageously large contact ratios.

What is claimed is:

1. A constant velocity universal joint for use with a propeller shaft comprising:

a cup-shaped outer ring having a plurality of straight track grooves extending axially on a cylindrical inner peripheral surface, an inner ring having a plurality of straight track grooves formed on a convex spherical outer peripheral surface, the track grooves being opposite to the track grooves of the outer ring, wherein the track grooves of the inner and outer rings are elliptical or Gothic arched in cross-sectional shape, a plurality of balls, interposed between the track grooves of the inner and outer rings, for transmitting torque, a cage, accommodated in an annular space between the inner and outer rings, for holding the balls, the constant velocity universal joint provided with a stub shaft having a shaft portion inserted from an open end portion of the outer ring to mate with the inner ring to enable torque transmission and provided with a boot, attached to the open end portion of the outer ring and the shaft portion of the stub shaft, respectively, for sealing the joint, wherein a distal end surface of the inner ring is capable of abutting a bottom of the outer ring upon press fitting of the shaft portion of the stub shaft, wherein a track groove is formed on each of the outer peripheral surface of the inner ring and the inner peripheral surface of the outer ring so as to intersect each other; a ball is placed at an intersecting portion of both grooves; and the ball is interposed between the outer peripheral surface of the inner ring and the inner peripheral surface of the outer ring and held with the cage having a concave spherical inner peripheral surface, wherein the ball is made of a heat resisting steel and tempered after having been subjected to quenching or carbonitriding the ball has a surface hardness of 58 or more in HRC after having been tempered; and the maximum size of a carbide grain is 8 μm or less, and wherein at least a ratio of a groove radius of curvature at a contact point between the track groove of the inner ring and the ball to a radius of the ball is 1.05 to 1.10.

2. The constant velocity universal joint for use with a propeller shaft according to claim 1, wherein, of the track grooves of the inner and outer rings, a contact angle between at least the track groove of the inner ring and the ball is 35 to 45 degrees.

3. The constant velocity universal joint for use with a propeller shaft according to claim 1, wherein, of the track grooves of the inner and outer rings, a contact angle between at least the track groove of the inner ring and the ball is 35 to 45 degrees.

4. A constant velocity universal joint for use with a propeller shaft, comprising:

a cup-shaped outer ring having a plurality of straight track grooves extending axially on a cylindrical inner peripheral surface, an inner ring having a plurality of straight track grooves formed on a convex spherical outer peripheral surface, the track grooves being opposite to the track grooves of the outer ring, a plurality of balls, interposed between the track grooves of the inner and outer rings, for transmitting torque, a cage, accommodated in an annular space between the inner and outer rings, for holding the balls, the constant velocity universal joint provided with a stub shaft having a shaft portion inserted from an open end portion of the outer ring to mate with the inner ring to enable torque transmission and provided with a boot, attached to the open end portion of the outer ring and the shaft portion of the stub shaft, respectively, for sealing the joint, wherein a distal end surface of the inner ring is capable of abutting a bottom of the outer ring upon press fitting of the shaft portion of the stub shaft, wherein an annular groove is formed on the shaft end portion of the stub shaft; a stepped portion is formed so as to oppose the annular groove on the end portion of the inner ring; a ring with ends is installed in an annular space defined by these annular groove and stepped portion, the ring being circular in cross section and radially compressible; and thereby the stub shaft is axially fixed with respect to the inner ring, and wherein the outer ring has a flat bottom, and the stepped portion of the inner ring opposite to the annular groove on the shaft end portion of the stub shaft is formed at a position where the shaft end portion of the stub shaft does not protrude from an end portion of the inner ring.

5. The constant velocity universal joint according to claim 4, wherein a track groove is formed on each of the outer peripheral surface of the inner ring and the inner peripheral surface of the outer ring so as to intersect each other; a ball is placed at an intersecting portion of both grooves; and the ball is interposed between the outer peripheral surface of the inner ring and the inner peripheral surface of the outer ring and held with the cage having a concave spherical inner peripheral surface.

6. The constant velocity universal joint for use with a propeller shaft according to claim 5, wherein an inner diameter of an end portion of the cage is less than an outer diameter of the inner ring.

7. The constant velocity universal joint for use with a propeller shaft according to claim 5, wherein an inner diameter of an end portion of the cage is greater than an outer diameter of the inner ring.

8. The constant velocity universal joint for use with a propeller shaft according to claim 5, wherein a curvature center of a convex spherical outer peripheral surface of the inner ring is axially offset from a center of the ball.

9. The constant velocity universal joint for use with a propeller shaft according to claim 5, wherein the inner peripheral surface of the cage is concave spherical in, shape, and the radius of curvature of the concave spherical inner peripheral surface is substantially equal to the radius of curvature of the convex spherical outer peripheral surface of the inner ring.

10. The constant velocity universal joint for use with a propeller shaft according to claim 5, wherein the ball is made of a heat resisting steel and tempered after having been subjected to quenching or carbonitriding; the ball has a surface hardness of 58 or more in HRC after having been tempered; and the maximum size of a carbide grain is 8 $\mu$m or less.

11. The constant velocity universal joint for use with a propeller shaft according to claim 10, wherein the heat resisting steel has a content of alloy elements by mass of 0.6% to 1.3% of C, 0.3% to 3.0% of Si, 0.2% to 1.5% of Mn, 0.03% or less of P, 0.03% or less of S, 0.3% to 5.0% of Cr, 0.1 % to 3.0% of Ni, 0.050% or less of Al, 0.003°/a or less of Ti, 0.0015% or less of O, 0.015% or less of N, and the remainder of Fe and unavoidable impurities.

12. The constant velocity universal joint for use with a propeller shaft according to claim 10, wherein the track grooves of the inner and outer rings are elliptical or Gothic arched in cross-sectional shape; and at least a ratio of a groove radius of curvature at a contact point between the track groove of the inner ring and the ball to a radius of the ball is 1.05 to 1.10.

13. The constant velocity universal joint for use with a propeller shaft according to claim 12, wherein, of the track grooves of the inner and outer rings, a contact angle between at least the track groove of the inner ring and the ball is 35 to 45 degrees.

14. The constant velocity universal joint for use with a propeller shaft according to claim 11, wherein the track grooves of the inner and outer rings are elliptical or Gothic arched in cross-sectional shape; and at least a ratio of a groove radius of curvature at a contact point between the track groove of the inner ring and the ball to a radius of the ball is 1.05 to 1.10.

15. The constant velocity universal joint for use with a propeller shaft according to claim 14, wherein, of the track grooves of the inner and outer rings, a contact angle between at least the track groove of the inner ring and the ball is 35 to 45 degrees.

* * * * *